United States Patent
Genzer et al.

(10) Patent No.: US 12,018,170 B2
(45) Date of Patent: Jun. 25, 2024

(54) SUBSTRATE COATINGS: SYSTEMS, METHODS, AND TECHNIQUES

(71) Applicant: North Carolina State University, Raleigh, NC (US)

(72) Inventors: Jan Genzer, Raleigh, NC (US); Pandiyarajan Chinnayan Kannan, Raleigh, NC (US); Michael D. Dickey, Raleigh, NC (US); Kirill Efimenko, Apex, NC (US)

(73) Assignee: North Carolina State University, Raleigh, NC (US)

( * ) Notice: Subject to any disclaimer, the term of this patent is extended or adjusted under 35 U.S.C. 154(b) by 175 days.

(21) Appl. No.: 17/603,672

(22) PCT Filed: Apr. 17, 2020

(86) PCT No.: PCT/US2020/028754
§ 371 (c)(1),
(2) Date: Oct. 14, 2021

(87) PCT Pub. No.: WO2020/214945
PCT Pub. Date: Oct. 22, 2020

(65) Prior Publication Data
US 2022/0298378 A1    Sep. 22, 2022

Related U.S. Application Data

(60) Provisional application No. 62/835,858, filed on Apr. 18, 2019.

(51) Int. Cl.
| | | |
|---|---|---|
| *C09D 7/61* | (2018.01) | |
| *B05D 3/10* | (2006.01) | |
| *B05D 7/00* | (2006.01) | |
| *C09D 5/02* | (2006.01) | |
| *C09D 179/02* | (2006.01) | |
| *C09D 183/06* | (2006.01) | |

(52) U.S. Cl.
CPC .......... *C09D 179/02* (2013.01); *B05D 3/101* (2013.01); *B05D 3/104* (2013.01); *B05D 3/107* (2013.01); *B05D 7/586* (2013.01); *C09D 5/021* (2013.01); *C09D 7/61* (2018.01); *C09D 183/06* (2013.01)

(58) Field of Classification Search
None
See application file for complete search history.

(56) References Cited

U.S. PATENT DOCUMENTS

| | | | | |
|---|---|---|---|---|
| 2003/0192130 A1* | 10/2003 | Kaaret | ............... | D06M 13/236 8/115.51 |
| 2004/0157047 A1 | 8/2004 | Mehrabi et al. | | |
| 2005/0107520 A1* | 5/2005 | Gottschalk-Gaudig | ..................... | C08L 83/06 524/556 |
| 2007/0054077 A1 | 5/2007 | Baresse et al. | | |
| 2007/0196657 A1 | 8/2007 | Bhandarkar | | |
| 2009/0192248 A1* | 7/2009 | Palumbo | ............... | C09B 67/001 524/186 |
| 2013/0129907 A1 | 5/2013 | Popa et al. | | |
| 2018/0281015 A1* | 10/2018 | Kawakami | ............... | B05D 1/36 |
| 2021/0230459 A1* | 7/2021 | Hoevel | ................... | B32B 37/12 |

FOREIGN PATENT DOCUMENTS

| | | | | |
|---|---|---|---|---|
| WO | 2012075309 A1 | 6/2012 | | |
| WO | 2017066066 A1 | 4/2017 | | |
| WO | 2017165522 A1 | 9/2017 | | |
| WO | WO-2018183060 A1 * | 10/2018 | ............ | A01N 33/04 |
| WO | 2019201695 A1 | 10/2019 | | |
| WO | WO-2019201695 A1 * | 10/2019 | .......... | B32B 15/085 |

OTHER PUBLICATIONS

Findenig et al. "Creating Water Vapor Barrier Coatings from Hydrophilic Components" (2012) ACS Appl. Mater. Interfaces, 4, 3199-3206 (Year: 2012).*
Priolo, M. A., et al. "Super gas barrier of transparent polymer- clay multilayer ultrathin films." Nano letters 10.12 (2010): 4970-4974.
European Patent Office Extended European Search Report for application 20790532.4, dated Nov. 30, 2022 (11 pages).
Barthlott et al., "Purity of the Sacred Lotus, or Escape from Contamination in Biological Surfaces", Planta, 1997, vol. 202, pp. 1-8.
Borges et al., "Molecular Interactions Driving the Layer-by-Layer Assembly of Multilayers", Chemical Reviews, 2014, vol. 114, pp. 8883-8942.
Bose et al., "Process Optimization of Ultrasonic Spray Coating of Polymer Films", Langmuir, 2013, vol. 29, pp. 6911-6919.
Darmanin et al., "Superhydrophobic and Superoleophobic Properties in Nature", Materials Today, 2015, vol. 18, pp. 273-285.
Decher, "Fuzzy Nanoassemblies: Toward Layered Polymeric Multicomposites", Science, 1997, vol. 277, pp. 1232-1237.
Gao et al., "The 'Lotus effect' Explained: Two Reasons Why Two Length Scales of Topography Are Important", Langmuir, 2006, vol. 22, pp. 2966-2967.
Hensel et al., "The Springtail Cuticle as a Blueprint for Omniphobic Surfaces", Chemical Society Reviews, 2016, vol. 45, No. 2, pp. 323-341.
Holder et al., "Standard Test Method for Film Hardness by Pencil Test", ASTM International, 2011, vol. 5, pp. 1-3.

(Continued)

*Primary Examiner* — Jose I Hernandez-Kenney
(74) *Attorney, Agent, or Firm* — Michael Best & Friedrich LLP

(57) ABSTRACT

Systems and methods relate to applying a coating to a substrate. Coatings can be generated using layer-by-layer application techniques. Typically, application of a first aqueous solution is alternated with application of a second aqueous solution. Example first aqueous solutions include polyethyleneimine (PEI) and hydroxy-terminated poly(dimethylsiloxane) (PDMS-OH). Example second aqueous solutions include silicate and PDMS-OH. In some instances, first aqueous solutions and/or second aqueous solutions additionally include methyl-terminated PDMS (PDMS-$CH_3$).

14 Claims, 27 Drawing Sheets

(56) References Cited

OTHER PUBLICATIONS

Ortega et al., "Spray-Assisted Layer-by-Layer Assembly of Decorated PEI/PAA Films: Morphological, Growth and Mechanical Behavior", Journal of Coatings Technology Research, 2017, vol. 14, pp. 927-935.
Richardson et al., "Innovation in Layer-by-Layer Assembly", Chemical Reviews, 2016, vol. 116, pp. 14828-14867.
Smith et al., "Droplet Mobility on Lubricant-Impregnated Surfaces", Soft Matter, 2013, vol. 9, pp. 1772-1780.
Wang et al., "Bioinspired Surfaces with Superwettability: New Insight on Theory, Design, and Applications", Chemical Reviews, 2015, vol. 115, No. 16, pp. 8230-8293.
Wong et al., "Bioinspired Self-Repairing Slippery Surfaces with Pressure-Stable Omniphobicity", Nature, 2011, vol. 477, No. 7365, pp. 443-447.
Yao et al., "Recent Progress in Antireflection and Self-Cleaning Technology—From Surface Engineering to Functional Surfaces", Progress in Materials Science, 2014, vol. 61, pp. 94-143.
Zhai et al., "Stable Superhydrophobic Coatings from Polyelectrolyte Multilayers", Nano Letters, 2004, vol. 4, pp. 1349-1353.
Zhu et al., "Slippery Liquid-Infused Porous Surfaces (SLIPS) Using Layer-by-Layer Polyelectrolyte Assembly in Organic Solvent", Langmuir, 2018, vol. 34, pp. 4722-4731.
International Search Report and Written Opinion for Application No. PCT/US20/28754 dated Aug. 26, 2020 (16 pages).
International Preliminary Report on Patentability for Application No. PCT/US2020/028754 dated Sep. 28, 2021 (8 pages).
International Searching Authority Invitation to Pay Additional Fees for Application No. PCT/US20/28754 dated Jun. 30, 2020 (18 pages).

* cited by examiner

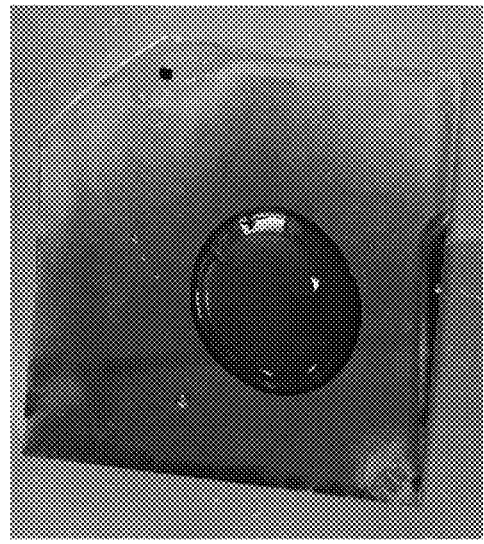
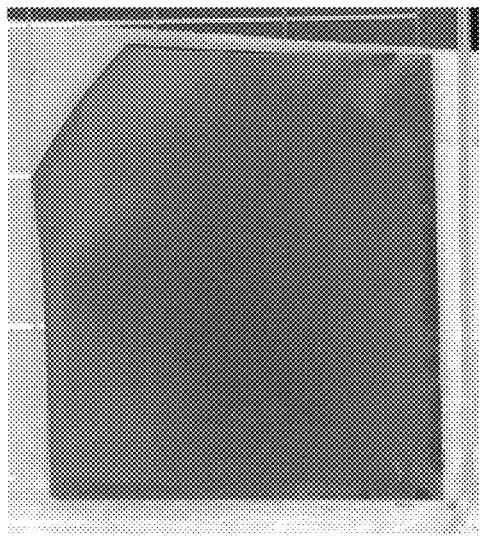
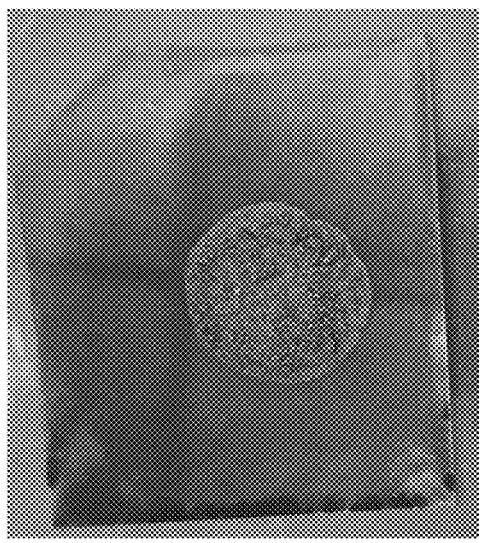
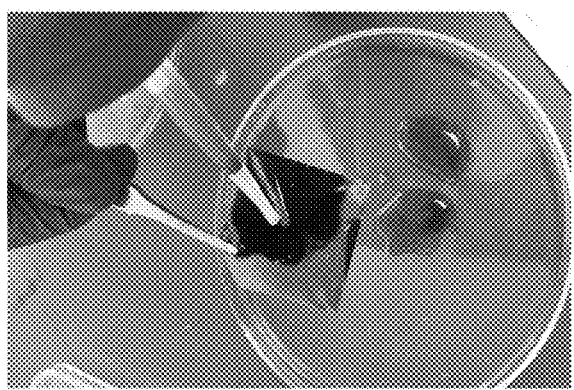
FIG. 12A
FIG. 12B
FIG. 12C
FIG. 12D

SUBSTRATE COATINGS: SYSTEMS, METHODS, AND TECHNIQUES

CROSS-REFERENCE TO RELATED APPLICATIONS

The present application is a national phase filing under 35 U.S.C. § 371 of International Application No. PCT/US2020/028754, filed Apr. 17, 2020, which claims the priority benefit of U.S. Provisional Patent Application No. 62/835,858, filed on Apr. 18, 2019, the entire contents both of which are hereby incorporated by reference.

TECHNICAL FIELD

The present disclosure relates to systems and methods for coating substrates. More particularly, systems and methods disclosed and contemplated herein involve generation of coatings from aqueous solutions.

INTRODUCTION

Coatings can be applied to various objects for a variety of reasons. Some coatings have a decorative function and other coatings can be functional. Coatings may also be both decorative and functional. Coatings may function, for example, as adhesives, as optical coatings, as protective coatings, and as adhesion-decreasing agents, to name a few. Example implementations can include adhesive tape, non-stick cookware, self-cleaning glass, paints, and scratch-resistant coatings.

SUMMARY

In one aspect, a method for generating a coating on a substrate is disclosed. The example method may include depositing a first aqueous solution onto the substrate, thereby forming a first layer and depositing a second aqueous solution onto the first layer, thereby forming a second layer. The first aqueous solution may include branched polyethyleneimine (PEI) and hydroxy-terminated poly(dimethylsiloxane) (PDMS-OH). The second aqueous solution may include silicate and PDMS-OH.

In another aspect, a system for applying a coating to a substrate is disclosed. The example system may include a first aqueous solution source including a first aqueous solution, a second aqueous solution source including a second aqueous solution, and a deposition assembly in fluid communication with both the first aqueous solution source and the second aqueous solution source. The first aqueous solution may include branched polyethyleneimine (PEI), hydroxy-terminated poly(dimethylsiloxane) (PDMS-OH) and methyl-terminated PDMS (PDMS-CH$_3$). The second aqueous solution includes sodium silicate, PDMS-OH, and PDMS-CH$_3$. The deposition assembly is configured to apply layer-by-layer (LbL) coatings.

In another aspect, a method for generating a coating on a substrate is disclosed. The example method may include depositing a first aqueous solution onto the substrate, thereby forming a first layer, rinsing the first layer, depositing a second aqueous solution onto the first layer, thereby forming a second layer, and rinsing the second layer after depositing the second aqueous solution. The first aqueous solution may include 0.1 wt % to 0.2 wt % branched polyethyleneimine (PEI), 0.005-0.025 wt % hydroxy-terminated poly(dimethylsiloxane) (PDMS-OH), and 0.005-0.025 wt % methyl-terminated PDMS (PDMS-CH$_3$). The second aqueous solution may include 0.15-0.37 wt % sodium silicate, 0.05-0.15 wt % PDMS-OH, and 0.05-0.15 wt % PDMS-CH$_3$.

There is no specific requirement that a material, technique or method relating to substrate coatings include all of the details characterized herein, in order to obtain some benefit according to the present disclosure. Thus, the specific examples characterized herein are meant to be exemplary applications of the techniques described, and alternatives are possible.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 12A is a photograph of a substrate coated with an example embodiment of a coating. FIG. 12B is a photograph after depositing a slurry onto the substrate in FIG. 12A. FIG. 12C is a photograph of the dry slurry in FIG. 12B. FIG. 12D is a photograph of the sample substrate after washing.

DETAILED DESCRIPTION

Figure 1:
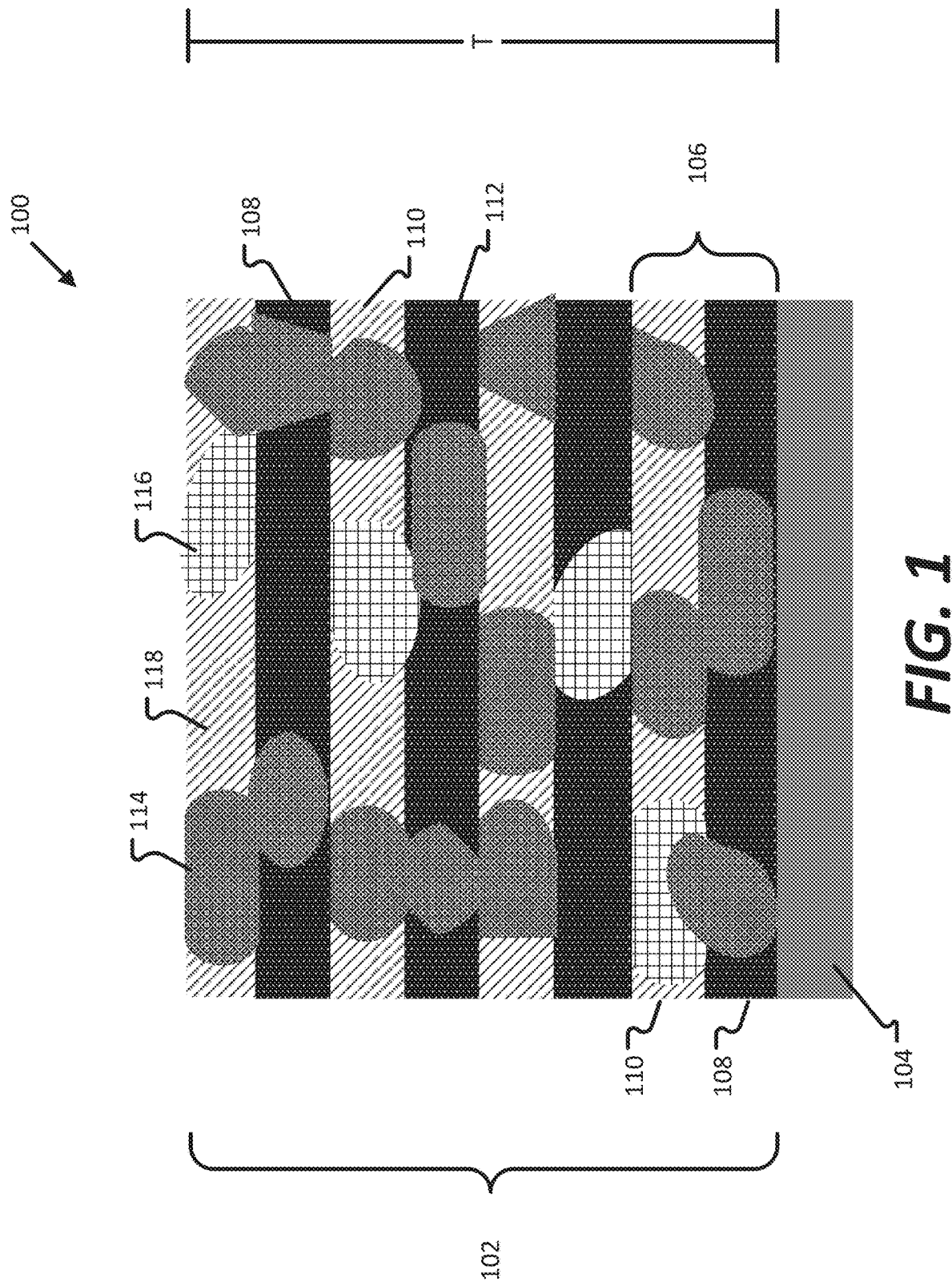
FIG. 1 is a schematic diagram of an example coated substrate.

Systems and methods disclosed and contemplated herein relate to applying coatings to substrates. Generally, a coating is a covering applied to a surface of an object, where the object is usually referred to as the substrate. Exemplary coatings can be formed via layer-by-layer application. Typically, a first aqueous solution is deposited as a layer and a second aqueous solution is deposited as another layer. Water-soluble components can be combined in the aqueous solutions and the systems and methods can be considered "eco-friendly." The solutions may be deposited directly or indirectly on the substrate, and the solutions may be deposited directly or indirectly on one another. In other words, there may be other layers therebetween.

Resulting coatings have various properties suitable for a variety of applications. For example, coatings can have slippery properties and can be particularly useful in architectural, automotive, marine, medical, and food-packaging applications. As examples, instantly disclosed coatings can cause unwanted fluids and/or biological foulants to slide off the coating and/or to be repelled by the coating.

Exemplary coatings generated using the systems and methods disclosed herein have shown one or more of the following properties: non-wetting, optically clear, ability to be used in layer-by-layer application systems, mechanical flexibility, durability, regeneration, avoiding biofouling, and UV-resistance. That said, there is no requirement that a coating resulting from instantly disclosed systems and methods include all of the aforementioned properties, in order to obtain some benefit according to the present disclosure.

Instantly disclosed and contemplated coatings can be distinguished from various existing coatings in a variety of aspects. For instance, structured solid surfaces typically have non-wetting properties, yet none of the other properties typically demonstrated by coatings disclosed herein. As another example, Teflon™ may demonstrate non-wetting, durability, and UV-resistance, but none of the other properties typically demonstrated by coatings disclosed herein. As another example, slippery liquid-infused porous surfaces (SLIPS) may demonstrate non-wetting, mechanical flexibility, durability, and UV-resistance, but none of the other properties typically demonstrated by coatings disclosed herein. SLIPs coatings also require 2-3 steps in forming slippery coatings with layer-by-layer techniques, which includes impregnation of the coating with lubricant.

I. Definitions

Unless otherwise defined, all technical and scientific terms used herein have the same meaning as commonly understood by one of ordinary skill in the art. In case of conflict, the present document, including definitions, will control. Example methods and materials are described below, although methods and materials similar or equivalent to those described herein can be used in practice or testing of the present disclosure. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

Definitions of specific functional groups and chemical terms are described in more detail below. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

II. Example Coatings

Example coatings disclosed and contemplated herein are typically formed through layer-by-layer application techniques. Layer-by-layer application techniques usually include deposition of a first solution and deposition of a second solution. The sections below discuss various exemplary aspects of solutions usable in the systems and methods disclosed and contemplated herein.

A. Example Aqueous Solutions

Exemplary aqueous solutions include various components dissolved in a water-based medium. Broadly characterized, components in solution include polyelectrolytes, "liquid glass," and silicones. Usually, different solutions are used and each solution has a different formulation. For ease of discussion, the different solutions will be referred to as a first aqueous solution and a second aqueous solution. The use of the relative terms "first" and "second" does not impart any limitations on an order of application.

An example first aqueous solution may include branched polyethyleneimine (PEI). PEI has a molecular weight of about 25,000 Da (g/mol) and has the following structure (I):

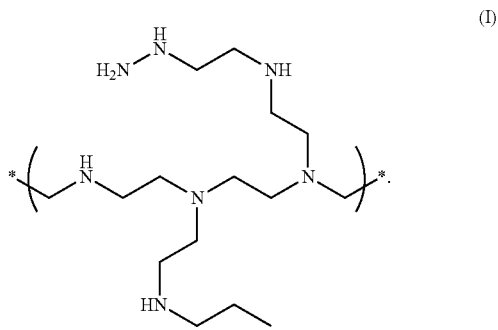

The first aqueous solution may also include hydroxy-terminated poly(dimethylsiloxane) (PDMS-OH). PDMS-OH has a molecular weight of about 1,000 Da (g/mol) and structure II shown below.

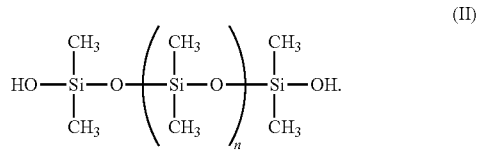

The first aqueous solution may also include methyl-terminated PDMS (PDMS-CH$_3$). PDMS-CH$_3$ has a molecular weight of about 1250 Da (g/mol) and structure III shown below:

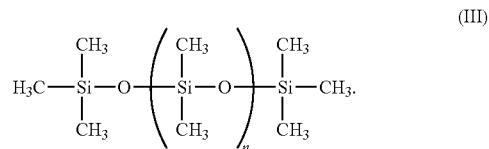

An example second aqueous solution may include silicate. Example silicate includes sodium silicate, also known as liquid glass or water glass, and potassium silicate. Sodium silicate, also referred to as sodium metasilicate, has a molecular weight of 122 Da (g/mol) and structure IV shown below.

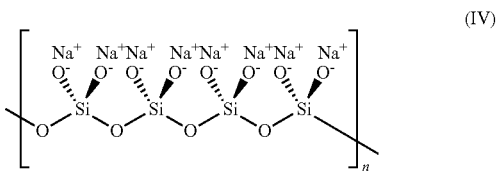

Second aqueous solutions can also include PDMS-OH and/or PDMS-CH$_3$.

Components in first aqueous solutions may be present in various amounts. For instance, PEI can be present in first aqueous solutions at from 0.1 wt % to 0.2% wt. In various implementations, PEI can be present in first aqueous solutions at from about 0.1 wt % to about 0.2 wt %; from about 0.12 wt % to about 0.18 wt %; from about 0.14 wt % to about 0.16 wt %; from about 0.1 wt % to about 0.15 wt %; from about 0.15 wt % to about 0.2 wt %; from about 0.1 wt % to about 0.13 wt %; from about 0.13 wt % to about 0.16 wt %; or from about 0.16 wt % to about 0.2 wt %. In various implementations, PEI is present in first aqueous solutions in an amount that is at least 0.1 wt %; at least 0.11 wt %; at least 0.12 wt %; at least 0.13 wt %; at least 0.14 wt %; at least 0.15 wt %; at least 0.16 wt %; at least 0.17 wt %; at least 0.18 wt %; or at least 0.19 wt %. In various implementations, PEI is present in the first aqueous solutions in an amount that is no greater than 0.2 wt %; no greater than 0.19 wt %; no greater than 0.18 wt %; no greater than 0.17 wt %; no greater than 0.16 wt %; no greater than 0.15 wt %; no greater than 0.14 wt %; no greater than 0.13 wt %; no greater than 0.12 wt %; or no greater than 0.11 wt %.

PDMS-OH can be present in the first aqueous solution at various amounts. For example, PDMS-OH can be present in the first aqueous solution at from 0.005 wt % to 0.025 wt %. In various implementations, PDMS-OH can be present in the first aqueous solution at from about 0.005 wt % to about 0.025 wt %; from about 0.008 wt % to about 0.022 wt %; from about 0.01 wt % to about 0.02 wt %; from about 0.013 wt % to about 0.017 wt %; from about 0.005 wt % to about 0.011 wt %; from about 0.011 wt % to about 0.017 wt %; from about 0.017 wt % to about 0.013 wt %. In various implementations, PDMS-OH is present in the first aqueous solution in an amount that is at least 0.005 wt %; at least 0.007 wt %; at least 0.009 wt %; at least 0.011 wt %; at least 0.013 wt %; at least 0.015 wt %; at least 0.017 wt %; at least 0.019 wt %; at least 0.021 wt %; or at least 0.023 wt %. In various implementations, PDMS-OH is present in the first aqueous solution in an amount that is no greater than 0.025 wt %; no greater than 0.023 wt %; no greater than 0.021 wt %; no greater than 0.019 wt %; no greater than 0.017 wt %; no greater than 0.015 wt %; no greater than 0.013 wt %; no greater than 0.011 wt %; no greater than 0.009 wt %; or no greater than 0.007 wt %.

PDMS-CH$_3$ can be present in first aqueous solutions in the same amount as PDMS-OH or in a similar amount. For instance, a weight ratio of PDMS-OH to PDMS-CH$_3$ in first aqueous solutions may be in a ratio of about 1:1; a ratio of about 1:0; a ratio of about 2:1 or greater than 2:1; a ratio of about 3:1 or greater than 3:1; a ratio of about 3:2 or greater than 3:2; a ratio of about 5:2 or greater than about 5:2; a ratio of about 4:3 or greater than about 4:3; or a ratio of about 5:4 or greater than about 5:4.

Components in the second aqueous solution can be present in various amounts. For instance, silicate, such as sodium silicate, can be present in second aqueous solutions in an amount from 0.15 wt % to 0.37 wt %. In various implementations, silicate, such as sodium silicate, can be present in second aqueous solutions in an amount from about 0.15 wt % to about 0.37 wt %; from about 0.18 wt % to about 0.34 wt %; from about 0.21 wt % to about 0.31 wt %; from about 0.24 wt % to about 0.28 wt %; from about 0.15 wt % to about 0.25 wt %; from about 0.25 wt % to about 0.37 wt %; from about 0.16 wt % to about 0.22 wt %; from about 0.23 wt % to about 0.29 wt %; or from about 0.29 wt % to about 0.37 wt %. In various implementations, silicate, such as sodium silicate, can be present in second aqueous solutions in an amount no less than 0.15 wt %; no less than 0.18 wt %; no less than 0.21 wt %; no less than 0.24 wt %; no less than 0.27 wt %; no less than 0.3 wt %; no less than 0.33 wt %; or no less than 0.35 wt %. In various implementations, silicate, such as sodium silicate, can be present in second aqueous solutions in an amount no greater than 0.37 wt %; no greater than 0.34 wt %; no greater than 0.31 wt %; no greater than 0.28 wt %; no greater than 0.25 wt %; no greater than 0.22 wt %; no greater than 0.18 wt %; or no greater than 0.17 wt %.

PDMS-OH can be present in the second aqueous solution in various amounts. For example, PDMS-OH can be present in the second aqueous solution an amount from 0.05 wt % to 0.15 wt %. In various implementations, PDMS-OH can be present in the second aqueous solution an amount from about 0.05 wt % to about 0.15 wt %; from about 0.07 wt % to about 0.13 wt %; from about 0.09 wt % to about 0.11 wt %; from about 0.05 wt % to about 0.1 wt %; from about 0.1 wt % to about 0.15 wt %; from about 0.05 wt % to about 0.08 wt %; or from about 0.08 wt % to about 0.11 wt %; from about 0.11 wt % to about 0.15 wt %. In various implementations, PDMS-OH can be present in second aqueous solutions in an amount no less than 0.05 wt %; no less than 0.07 wt %; no less than 0.09 wt %; no less than 0.11 wt %; no less than 0.13 wt %; or no less than 0.14 wt %. In various implementations, PDMS-OH can be present in second aqueous solutions in an amount no greater than 0.15 wt %; no greater than 0.13 wt %; no greater than 0.11 wt %; no greater than 0.09 wt %; no greater than 0.07 wt %; or no greater than 0.06 wt %.

PDMS-CH$_3$ can be present in second aqueous solutions in the same amount as PDMS-OH or in a similar amount. For instance, a weight ratio of PDMS-OH to PDMS-CH$_3$ in second aqueous solutions may be in a ratio of about 1:1 ratio; a ratio of about 1:0; a ratio of about 2:1 or greater than about 2:1; a ratio of about 3:1 or greater than 3:1; a ratio of about 3:2 ratio or greater than 3:2; a ratio of about 5:2 or greater than 5:2; a ratio of about 4:3 or greater than 4:3; or a ratio of about 5:4 or greater than 5:4.

First aqueous solutions typically have basic pH. For instance, first aqueous solutions can have a pH of between 9.5-10.5; between 9.5-10; between 10-10.5; or between 9.8-10.2.

Second aqueous solutions typically have acidic pH. For instance, second aqueous solutions can have a pH of between 3.8-5; between 3.8-4.4; between 4-4.5; between 4.5-5; or between 4.1-4.7.

B. Example Coated Substrate

FIG. 1 is a schematic depiction of example coated substrate 100. Coated substrate 100 includes coating 102 on substrate 104. Example materials usable for substrate 104 are discussed in greater detail below. Coating 102 includes a plurality of bilayers 106 applied using layer-by-layer techniques. As shown, coating 102 includes four bilayers 106. However, other embodiments can include more or fewer bilayers 106. In some embodiments, there may be another layer between the substrate 100 and bilayers 106—in other words, the bilayer 106 need not be directly applied to the substrate 100.

Each bilayer 106 includes a first aqueous solution layer 108 and a second aqueous solution layer 110. As shown, the first aqueous solution layer 108 was the first layer applied to substrate 104, followed by application of the second aqueous solution layer 110. However, in other embodiments, the second aqueous solution layer 110 can be the first layer applied to substrate 104, followed by application of first aqueous solution layer 108. As shown, the second aqueous solution layer 110 was the last layer applied and is the "top" layer of coating 102. However, in other embodiments, first aqueous solution layer 108 can be the last layer applied and the "top" layer of coating 102.

First aqueous solution layer 108 includes dispersed PEI 112, dispersed PDMS-OH 114, and dispersed PDMS-CH$_3$ 116. Second aqueous solution layer 110 includes dispersed sodium silicate 118, dispersed PDMS-OH 114, and dispersed PDMS-CH$_3$ 116. In some instances, potassium silicate may be used in place of sodium silicate.

Without being bound by a particular theory, it is hypothesized that, during or after coating formation, PDMS-CH$_3$ and/or PDMS-OH chains populate the free surface and endow slippery characteristics to the coating. Without being bound by a particular theory, it is hypothesized that, in some embodiments, when washed from the surface, additional PDMS-CH$_3$ and/or PDMS-OH chains from the coating can diffuse to the surface, thereby creating a "self-replenishing" surface.

C. Aspects of Exemplary Bilayers

Coatings may be applied to substrates using layer-by-layer technology, in which the process includes successively depositing two different aqueous solutions. Various deposition methods are possible, such as, for example, spray deposition and dip coating.

In various implementations, a coating can include various numbers of bilayers, such as 5-30 bilayers; 5-15 bilayers; 6-25 bilayers; 10-18 bilayers; 12-15 bilayers; 8-22 bilayers; 12-28 bilayers; 10-15 bilayers; 10-14 bilayers; 15-20 bilayers; or 20-25 bilayers. In some embodiments, a coating includes no fewer than 5 bilayers; no fewer than 8 bilayers; no fewer than 10 bilayers; no fewer than 12 bilayers; no fewer than 16 bilayers; no fewer than 20 bilayers; no fewer than 25 bilayers; or no fewer than 28 bilayers. In some embodiments, a coating includes no more than 30 bilayers; no more than 25 bilayers; no more than 20 bilayers; no more than 15 bilayers; or no more than 10 bilayers. Indeed, in some instances, an upper limit on the number of bilayers may only be provided because of time and/or cost constraints.

When generating a coating, which aqueous solution is first applied to a substrate can be selected based on chemical and/or physical attributes of the substrate. As mentioned above, first aqueous solutions disclosed herein have a basic pH and second aqueous solutions disclosed herein have an acidic pH. Thus, either the first aqueous solution or the second aqueous solution can be selectively chosen to be the initial layer applied, so as to achieve one or more of the properties disclosed herein.

When generating a coating with layer-by-layer technology, one of the aqueous solutions necessarily is the last aqueous solution applied. In various implementations, either the first aqueous solution or the second aqueous solution can be the last aqueous solution applied when generating a coating.

Coatings generated using systems and methods disclosed and contemplated herein can have thicknesses depending upon a variety of factors and considerations. As used herein, "coating thickness" is a measure from a substrate surface to the upper surface of the coating, along a direction normal to the substrate surface.

Referring for the moment to FIG. 1, coating 102 is shown as having thickness T. Exemplary coatings can have various thicknesses, for instance, exemplary coatings can have a thickness between 0.025-0.1 μm; between 0.1-0.5 μm; between 0.2-0.4 μm; between 0.1-0.3 μm; between 0.3-0.5 μm; between 0.1-0.2 μm; between 0.12-0.18 μm; between 0.14-0.16 μm; between 0.1-0.14 μm; between 0.14-0.17 μm; between 0.17-0.2 μm; between 0.2-0.3 μm; between 0.05-0.125 μm; between 0.065-0.1 μm; or between 0.1-0.18 μm. In various implementations, exemplary coatings can have a thickness that is at least 0.025 μm; at least 0.05 μm at least 0.1 μm; at least 0.14 μm; at least 0.18 μm; at least 0.22 μm; at least 0.28 μm; at least 0.35 μm; at least 0.4 μm; or at least 0.45 μm. In various implementations, exemplary coatings can have a thickness of no greater than 0.5 μm; no greater than 0.42 μm; no greater than 0.35 μm; no greater than 0.28 μm; no greater than 0.2 μm; no greater than 0.15 μm; no greater than 0.1 μm; no greater than 0.07 μm; or no greater than 0.05 μm.

D. Example Coating Physical Characteristics

Broadly, example coatings generated using systems, methods, and techniques disclosed herein exhibit slippery characteristics. These and other characteristics of coatings that can be generated using systems, methods, and techniques disclosed herein are discussed next.

Example coatings can have slippery characteristics, which can be quantified by determining a sliding angle of the coated substrate. Sliding angles (in degrees) can vary depending upon quantity and type of liquid used. As used herein, a sliding angle θ is defined as:

$$\theta = \tan^{-1} \frac{\text{height}}{\text{width}}$$

Additional details regarding physical apparatus and testing conditions for slide angle determination are provided below with respect to experimental data and shown in FIG. 5.

For tests using 3 mL of water, example coatings can have a sliding angle of between 5°-10°; between 6°-8°; between 5°-7°; between 7°-9°; or between 6°-9°. In various implementations, for tests using 3 mL of water, example coatings have a sliding angle of no greater than 10°; no greater than 9°; no greater than 8°; no greater than 7°; or no greater than 6°.

For tests using 25 μL of water, example coatings can have a sliding angle of between 6°-18°; between 6°-14°; between 5°-7°; between 7°-15°; or between 12°-18°. In various implementations, for tests using 25 μL of water, example coatings have a sliding angle of no greater than 18°; no greater than 15°; no greater than 12°; no greater than 8°; or no greater than 6°.

Exemplary coatings can also display hydrophobicity. Hydrophobicity of coated substrates can be determined by measuring a water contact angle. Additional details regarding determining water contact angles are provided below with respect to experimental data. Exemplary coatings can have water contact angles between 115°-120°; between 117°-119°; between 115°-117°; between 118°-120°; or between 116°-120°. In various implementations, exemplary coatings can have water contact angles no less than 115°; no less than 116°; no less than 117°; no less than 118°; or no less than 119°. The aforementioned water contact angles can be for coatings generated 1 day prior; 3 days prior; 5 days prior; 7 days prior; 30 days prior; and/or 45 days prior.

Exemplary coatings can also display favorable optical properties. For instance, coatings can have 93-96% transmittance; 94-95% transmittance; 93-95% transmittance; or 94-96% transmittance. In various implementations, coatings can have no less than 90% transmittance; no less than 93% transmittance; no less than 94% transmittance; or no less than 95% transmittance. Transmittance values can be obtained using UV-Vis spectroscopy.

Exemplary coatings can also have haziness values between 0.4%-0.9%; between 0.5%-0.7%; between 0.4%-0.6%; between 0.6%-0.9%; between 0.4%-0.5%; or between 0.7%-0.8%. In various implementations, coatings can have haziness values no greater than 1%; no greater than 0.9%; no greater than 0.8%; no greater than 0.7%; no greater than 0.6%; or no greater than 0.5%.

Exemplary coatings are mechanically hard when subjected to H-501 Pencil Hardness Tests. In some instances, exemplary coatings have HB pencil gouge hardness. In some instances, exemplary coatings have B pencil scratch hardness.

Exemplary coatings can also show resistance to biofouling while retaining slipperiness. For instance, example coatings have demonstrated protein repellence and repellent properties against bird feces, sand slurries, pollens, dust, and debris. Exemplary coatings have also shown scratch resistance against Q-tips, KimWipes, isopropyl alcohol (IPA), and a Dremel rotary drill fitted with a wool cover at 35,000 rpm. Example coatings have also shown durability, where coatings are stable against glass cleaning detergent solutions and tap water rinses at low to high pressures.

III. Example Systems for Applying Coatings

Figure 2:
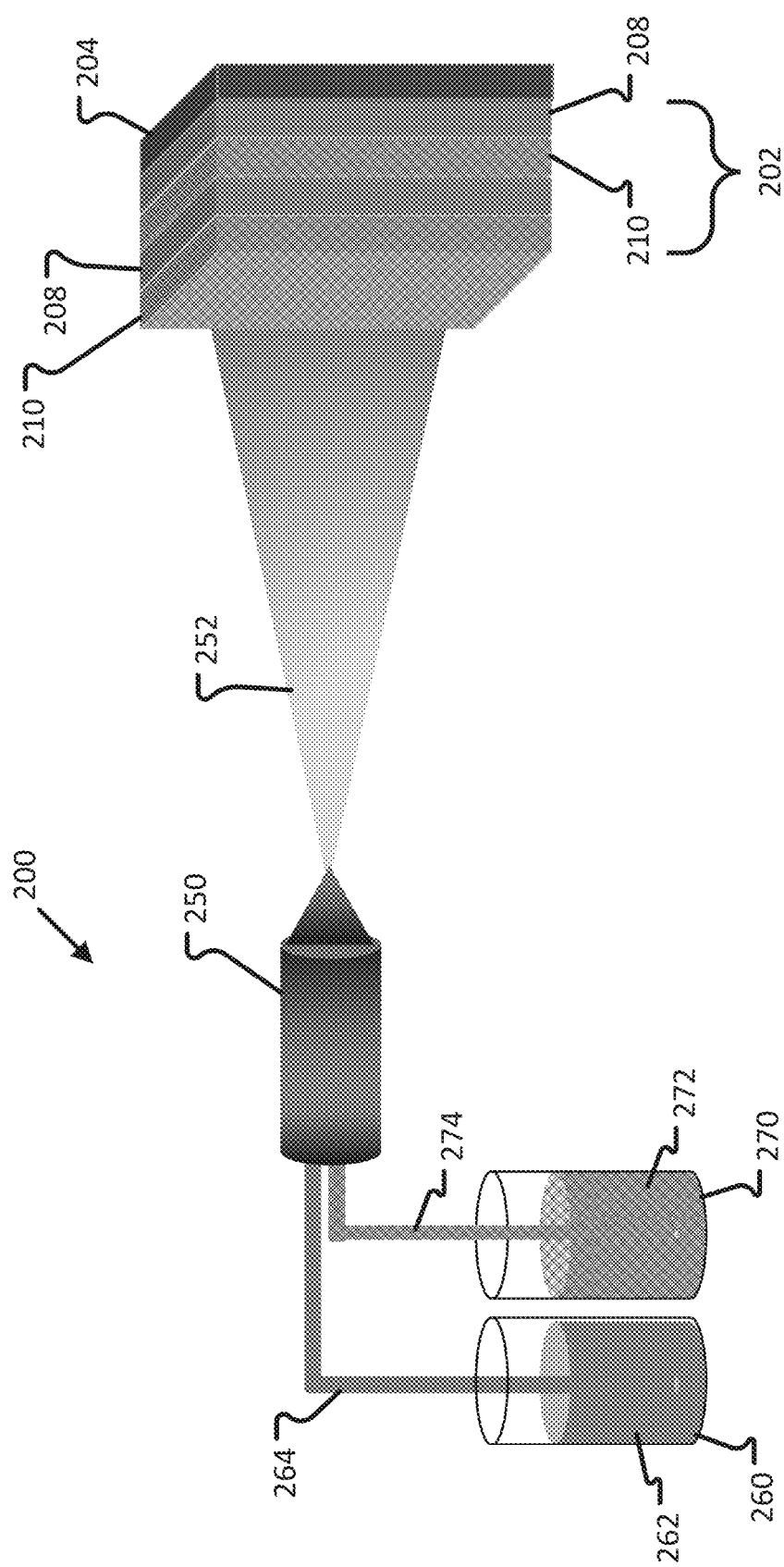
FIG. 2 is a schematic illustration of an example system for applying coatings.

FIG. 2 shows a schematic illustration of example system 200 for applying coatings. System 200 includes deposition assembly 250, first aqueous solution source 260 and second aqueous solution source 270. Deposition assembly 250 is in fluid communication with first aqueous solution source 260, shown as connection 264. Deposition assembly 250 is also in fluid communication with second aqueous solution source 270, shown as connection 274. Other embodiments can include more or fewer components.

FIG. 2 also shows substrate 204 with coating 202. Coating 202 is shown schematically as including first aqueous solution layer 208 and second aqueous solution layer 210.

Deposition assembly 250 is configured to apply coatings to substrates. Deposition assembly 250 is configured to apply layer-by-layer coatings to substrate 204. In the embodiment shown, deposition assembly 250 is a spray assembly, however other deposition methods may be used, such as dip coating. During coating application, deposition assembly 250 draws fluid from first aqueous solution source 260 and second aqueous solution source 270 and discharges spray 252 onto substrate 204. Typically, deposition assembly 250 alternates between depositing fluid from first aqueous solution source 260 and second aqueous solution source 270.

In some instances, deposition assembly 250 may include two separate spraying assemblies, each configured to apply either the fluid from first aqueous solution source 260 or the fluid from second aqueous solution source 270. In some instances, multiple spray assemblies 250 are used.

Deposition assembly 250 can include various components for applying spray 252, such as one or more pumps, one or more nozzles, and one or more fluid containers, to name a few. Deposition assembly 250 can include computing components configured to implement various coating programs, where example computing components can include system on a chip (SoC) components, processing unit(s), and memory and storage devices.

Deposition assembly 250 can be configured to successively deposit layers onto substrate 204 based on predetermined layer parameters, thereby forming coating 202. For example, deposition assembly 250 can be configured to apply a predetermined number of bilayers, such as 10 bilayers, 15 bilayers, 20 bilayers, and 25 bilayers, to name a few. Other contemplated bilayer configurations are described in greater detail above.

Usually, a number of deposited bilayers corresponds to a thickness of coating 202. Accordingly, coating thickness may be controlled by setting the predetermined number of bilayers to be applied by deposition assembly 250. As one example, deposition assembly 250 can be configured to successively deposit a layer of the first aqueous solution and a layer of the second aqueous solution until a coating thickness is at least 0.1 µm. Other coating thicknesses are contemplated and example coating thicknesses are described in greater detail above.

First aqueous solution source 260 includes a first aqueous solution. The first aqueous solution can include polyethyleneimine (PEI), hydroxy-terminated poly(dimethylsiloxane) (PDMS-OH) and methyl-terminated PDMS (PDMS-CH$_3$). In some implementations, the first aqueous solution includes no less than 0.005 wt % PDMS-OH and no more than 0.025 wt % PDMS-OH. In some implementations, the first aqueous solution includes no less than 0.005 wt % PDMS-CH$_3$ and no more than 0.025 wt % PDMS-CH$_3$. In some implementations, the first aqueous solution includes a 1:1 ratio of PDMS-OH to PDMS-CH$_3$. In some implementations, the first aqueous solution includes 0.1 wt % to 0.2 wt % PEI. Additional aspects regarding first aqueous solutions usable in system 200, including various possible amounts of components, are discussed above.

Second aqueous solution source 270 includes a second aqueous solution. In the embodiment shown, the second aqueous solution includes a silicate such as sodium silicate, PDMS-OH, and PDMS-CH$_3$. In some implementations, the second aqueous solution includes no less than 0.05 wt % and no more than 0.15 wt % PDMS-OH. In some implementations, the second aqueous solution includes no less than 0.05 wt % and no more than 0.15 wt % PDMS-CH$_3$. In some implementations, the second aqueous solution includes a 1:1 ratio of PDMS-OH to PDMS-CH$_3$. In some implementations, the second aqueous solution includes 0.15 wt % to 0.37 wt % sodium silicate. Additional aspects regarding second aqueous solutions usable in system 200, including various possible amounts of components, are discussed above.

In some instances, deposition assembly 250 can be in communication with a third fluid source. Example third fluid sources can provide fluid used during rinsing cycles. The rinsing cycles may be implemented between application of layers comprising fluid from the first aqueous solution source 260 and/or fluid from the second aqueous solution source 270. An example fluid usable for rinsing is water.

IV. Example Methods for Applying Coatings

Figure 3:
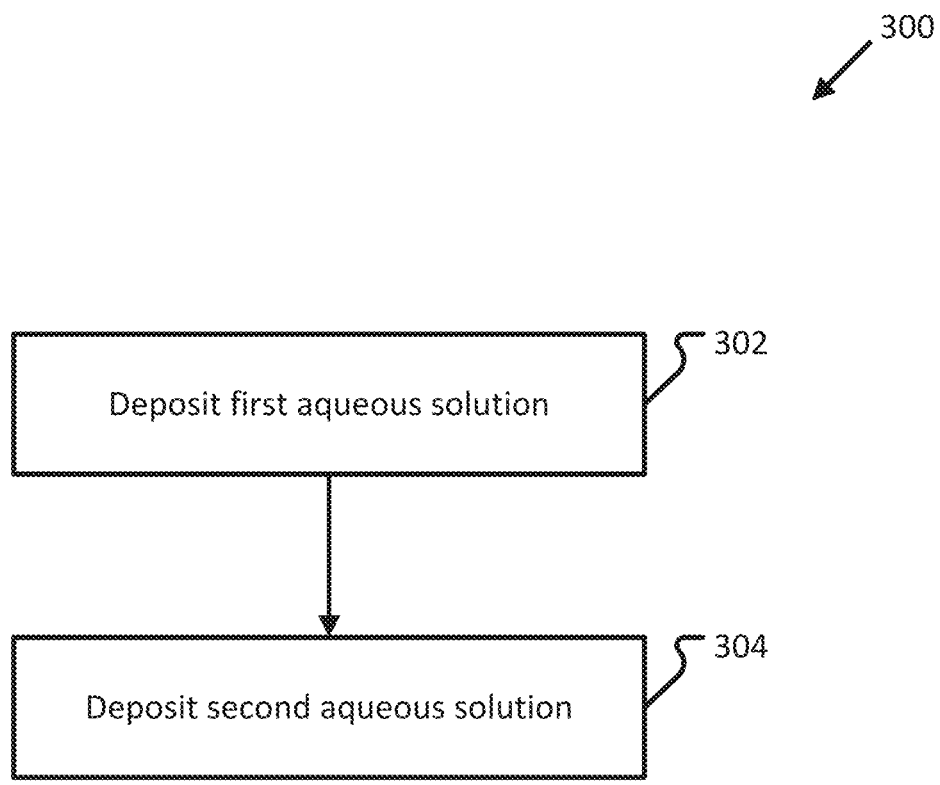
FIG. 3 shows an example method for generating a coating on a substrate.

FIG. 3 shows example method 300 for generating a coating on a substrate. Method 300 includes depositing a first aqueous solution (operation 302) and depositing a second aqueous solution (operation 304). Method 300 can be implemented using example system 200 described above. As shown and described below, method 300 does not require a separate step including impregnation of a coating with lubricant. Other embodiments can include more or fewer operations.

Example method 300 begins by depositing a first aqueous solution (operation 302) onto a substrate. Depositing the first aqueous solution (operation 302) results in a first layer on the substrate. Exemplary aspects of first aqueous solutions are described in greater detail above.

Various apparatus and application techniques can be used to deposit the first aqueous solution. For example, a spraying apparatus configured for layer-by-layer deposition can perform spray coating of the first aqueous solution.

After depositing the first aqueous solution (operation 302), a second aqueous solution is deposited (operation 304). Depositing the second aqueous solution (operation 304) results in a second layer on top of the first layer. Exemplary aspects of second aqueous solutions are described in greater detail above.

Various apparatus and application techniques can be used to deposit the second aqueous solution. For example, a spraying apparatus configured for layer-by-layer deposition can perform spray coating of the first aqueous solution. Typically, the same application technique is used for depositing second aqueous solution (operation 304) as depositing first aqueous solution (operation 302). In some instances, the same apparatus performs depositing second aqueous solution (operation 304) and depositing first aqueous solution (operation 302).

In some embodiments, a rinsing step is performed after depositing the first aqueous solution (operation 302) and before depositing the second aqueous solution (operation 304). In some embodiments, a wait time (a predetermined amount of time) elapses between applying the solutions and/or between rinsing and applying the solutions. Example wait times include 3 seconds and 10 seconds. In an example implementation, after application of either the first aqueous solution or the second aqueous solution, a wait time is 3 seconds, and after rinsing, a wait time is 10 seconds. Other wait times are possible.

Although shown as depositing the first aqueous solution onto the substrate, method 300 can include depositing the second aqueous solution onto the substrate, thereby forming a first layer. In those instances, the first aqueous solution is then deposited onto the second aqueous solution, thereby forming a second layer.

Method 300 can be repeated until a predetermined number of bilayers have been deposited onto the substrate. For example, method 300 can include depositing, successively, the first aqueous solution (operation 302) and then the second aqueous solution (operation 304) until the coating includes at least 15 bilayers; at least 20 bilayers; at least 25 bilayers; or other quantities of bilayers as discussed in greater detail above.

V. Example Applications and Substrates

Techniques and systems disclosed and contemplated herein can be applied to a variety of substrates for various applications. That is, example coatings disclosed and contemplated herein can be applied to substrates having various physical and chemical properties.

For example, substrates usable with disclosed coatings include silicon wafer material, glass material, polymer sheet material, polymer, and metal material. Example polymer material usable as substrates include polyethylene terephthalate (PET) and polyurethanes (PU). These coatings can have various functions in a variety of industries. Example applications include architectural, automotive, marine, medical, and food-packaging applications.

Usable substrates can have various geometric configurations. For instance, substrates can have cross-sections that are planar, substantially planar, and curved, to name a few. Substrates with other surface geometries can be used as well.

VI. Experimental Examples

Experimental examples were conducted and the results are discussed below.

A. Materials

Polyethyleneimine (PEI), sodium silicate/liquid glass (LG), sodium hydroxide (1N) and hydrochloric acid (HCl, 37%) were purchased from Sigma Aldrich and used as received without any further purification. Silanol-terminated and methyl-terminated silicones were purchased from Gelest and used without purification. Deionized (DI) water used in spray coatings obtained from Milli-Q-purification system with a resistivity of 15 MΩ·cm (Millipore, Billerica, USA). LbL films were deposited on silicon wafers purchased from Silicon Valley Microelectronics (Santa Clara, CA, USA) having an orientation of [100], the thickness of 0.5 mm, and a diameter of 100 mm. PET substrates used were received from Eastman Chemical Company (Kingsport, TN) and glass slides were purchased from Fisher-Scientific and cleaned with piranha solution prior to use.

B. Materials

Custom-made spray coating equipment from Eastman Chemical Company (Kingsport, TN) was employed for depositing the layers/bilayers. Infra-red spectra of the coatings were recorded using a Nicolet 6700 Fourier transform infrared spectrometer equipped with crystalline Ge in attenuated total reflection (ATR) mode under continuous nitrogen gas purging. Typically, 254 scans with a resolution of 4 cm$^{-1}$ were set to attain the spectrum of various layers deposited onto the silicon substrate. Wettability of the LbL films was characterized by using a Ramé-Hart contact angle goniometer (model no. 100-00, Succasunna, NJ) equipped with a (manual) liquid dispenser, camera, and image-processing software. Variable-angle spectroscopic ellipsometry (VASE, J.A. Woollam, USA) was used to assess the film thickness of the surface coatings. Time of Flight-Secondary Ion Mass Spectrometry (TOF-SIMS) was to characterize the chemical composition of the coating. Scanning electron microscopy was used to study the film morphology.

C. Preparation of Precursor Solutions

Coatings were generated using various precursor solutions. Example methods of preparing different experimental precursor solutions are provided below.

1. Preparation of PEI Solution 1 g of PEI was added to the 1 L of DI water to attain a concentration of 1 mg/ml of PEI solution (0.1 wt %). The above mixture was shaken vigorously for 5-10 minutes manually and then sonicated (Sonicator from Fisher Scientific, model FS110) for another 10-15 minutes. Upon dissolution, the pH of the solution was adjusted to 10.0 and then filtered using P8 filter paper.

2. Preparation of PAA Solution 2 g of polyacrylic acid (PAA) was added to 1 L of DI water to attain a concentration of 2 mg/ml of PAA solution (0.2 wt %). The above mixture was shaken for 5-10 minutes manually and then sonicated for another 10-15 minutes. Upon attaining dissolving, pH of the solution was then adjusted to 4.0 by adding HCl (37%), or NaOH (30%), and then filtered using P8 filter paper (Fisher brand filter paper with a coarse porosity and diameter of 18.5 cm).

3. Preparation of LG Solution 10 g of sodium silicate (37 wt %) was added to the 1 L volumetric flask and dissolved using DI water up to the mark to attain a concentration of 3.7 mg/mL of LG solution (0.37%). The above mixture was shaken for 5-10 minutes manually and then sonicated for another 10-15 minutes. Upon complete dissolution, pH of the solution was adjusted to 4.0 by adding HCl (37%) and filtered using P8 filter paper. This filtration may not remove precipitated sodium chloride dissolved in the solution. This is a known experimental drawback with which we proceed to the layer by layer deposition.

4. Preparation of PEI+PDMS-OH+PDMS-CH$_3$ Solution

About 200 ml of the filtered PEI solution (0.1 wt. %) was added to the 500 mL round bottom flask, then 20 µL of PDMS-OH (viscosity ~25 cSt, density=0.934 g/mL) and 20 µL of PDMS-CH$_3$ (viscosity ~5-10 cSt, density=0.934 g/ml) was added to the solution and stirred vigorously at 1200 rpm overnight at room temperature. In all our experiments, the density of silicone oil was assumed to be 1 g/mL.

5. Preparation of Sodium Silicate+PDMS-OH+PDMS-CHs Solution

About 200 mL of the filtered LG solution was added to the 250 mL (or 500 mL) round bottom flask, then 200 µL of PDMS-OH (viscosity ~25 cSt, density=0.96 g/mL) and 100 µL of PDMS-CH$_3$ (viscosity ~5-10 cSt, density=0.934 g/ml) were added to the solution and stirred rigorously with 1200 rpm for overnight at room temperature. In all experiments, the density of silicone oil was assumed to be 1 g/mL.

D. Preparation of Coated Substrates

Custom-made spray coating equipment from Eastman Chemical Company has been used for the LbL film deposition. The spray coating equipment drew from three solutions: Solution A, Solution B, and Solution C. Solution A was a solution of (i) PEI, (ii) PEI and PDMS-OH, or (iii) PEI, PDMS-OH, and PDMS-CH$_3$. Solution B was a solution of (i) PAA, (ii) sodium silicate, or (iii) sodium silicate and PDMS-OH. Solution C was pure water (used in a rinsing step to remove unreacted materials from the substrate surface).

In a typical experiment, solution A was sprayed for 4 s (0.24 g/s), waited for 3 s, then rinsed with solution C (water) for 10 s (0.35 g/s) and waited again for 6 s. After this, solution B was sprayed for 4 s (0.2 g/s), waited for 3 s, rinsed with solution C (water) for 10 s (0.35 g/s), then waited for 6 s. This sequence completed the first bilayer. The above steps were repeated to attain the desired number of bilayers (e.g., 25 bilayers) in total. After depositing the predetermined number of bilayers, the sample was dried as such in the sprayer under the ambient condition (inside the fumehood) and used for the analysis. Various samples were dried for 20-30 minutes and stored in ambient condition for 12-24 hours.

E. Tested Solutions

Different coatings were applied to a silicon substrate and tested. Thicknesses of each coating were also determined. Table 1, below, describes formulations for each coating and resulting coating thicknesses.

TABLE 1

Components of example coatings and resulting thicknesses on a substrate.

| Coating | Aqueous components of Layer 1 | Aqueous components of Layer 2 | Avg. Coating Thickness (μm) |
|---|---|---|---|
| Example A | PEI (0.1 wt %) | PAA (0.2 wt %) and PDMS-OH (0.05 wt %) | 1.4 |
| Example B | PEI (0.1 wt %) | PAA (0.2 wt %), sodium silicate (0.1 wt %), and PDMS-OH (0.1 wt %) | 1.1 |
| Example C | PEI (0.1 wt %) | sodium silicate (0.25 wt %) and PDMS-OH (0.065 wt %) | 0.21-0.35 |
| Example D | PEI (0.1 wt %) and PDMS-OH (0.01 wt %) | sodium silicate and PDMS-OH | 0.1-0.5 |
| Example E | PEI (0.1 wt %), PDMS-OH (0.01 wt %), and PDMS-CH$_3$ (0.01 wt %) | sodium silicate, PDMS-OH, and PDMS-CH$_3$ | 0.1-0.5 |

The thickness of the polymer films was measured using spectroscopic ellipsometry. Reflectivity scans were recorded at a 70° angle of incidence (relative to the vertical direction) in the spectral range of 400-1000 nm in 60 steps (10 nm/step). The ellipsometry data were modeled using the Fresnel formalism comprising a three-layer model in WVASE32 software (J.A. Woollam Co., version 3.682). Layer 1: Si substrate, Layer 2: SiO$_2$ (1.5-1.7 nm thick), Layer 3: polymer ad-layer (refractive index modeled as a Cauchy function, $n(\lambda)=A_n+b_n/\lambda^2$, where $A_n$ (=1.48-1.5) and $B_n$ (=0.01 μm$^2$) are starting fitting parameters.)

F. Water Contact Angle Measurements

Wettability of the coatings was characterized by measuring water contact angles using a Ramé-Hart contact angle goniometer (model no. 100-00, Succasunna, NJ) equipped with a (manual) liquid dispenser, camera, and image-processing software. A sessile method was employed to measure the static contact angles with a drop of DI water (volume of ~4-5 μL) at room temperature (~24-25° C.). The average contact angle was determined from 4-5 measurements. Table 2 below provides results of water contact angle measurements.

TABLE 2

Water contact angles for various example coatings.

| Coating | Water Contact Angle | Hydrophilic or Hydrophobic |
|---|---|---|
| Example A | 20°-30° | Hydrophilic |
| Example B | 50°-60° | Hydrophilic |
| Example C | 120°-130° | Hydrophobic |
| Example D | 115°-119° | Hydrophobic |
| Example E | 115°-119° | Hydrophobic |

The measured water contact angles of the Example A and Example B coatings indicated that the coatings were hydrophilic. The measured water contact angles of the Example C, Example D, and Example E coatings indicated that the coatings were hydrophobic. However, the Example C coating did not display slippery characteristics, in contrast to the Example D and Example E coatings.

Figure 4:
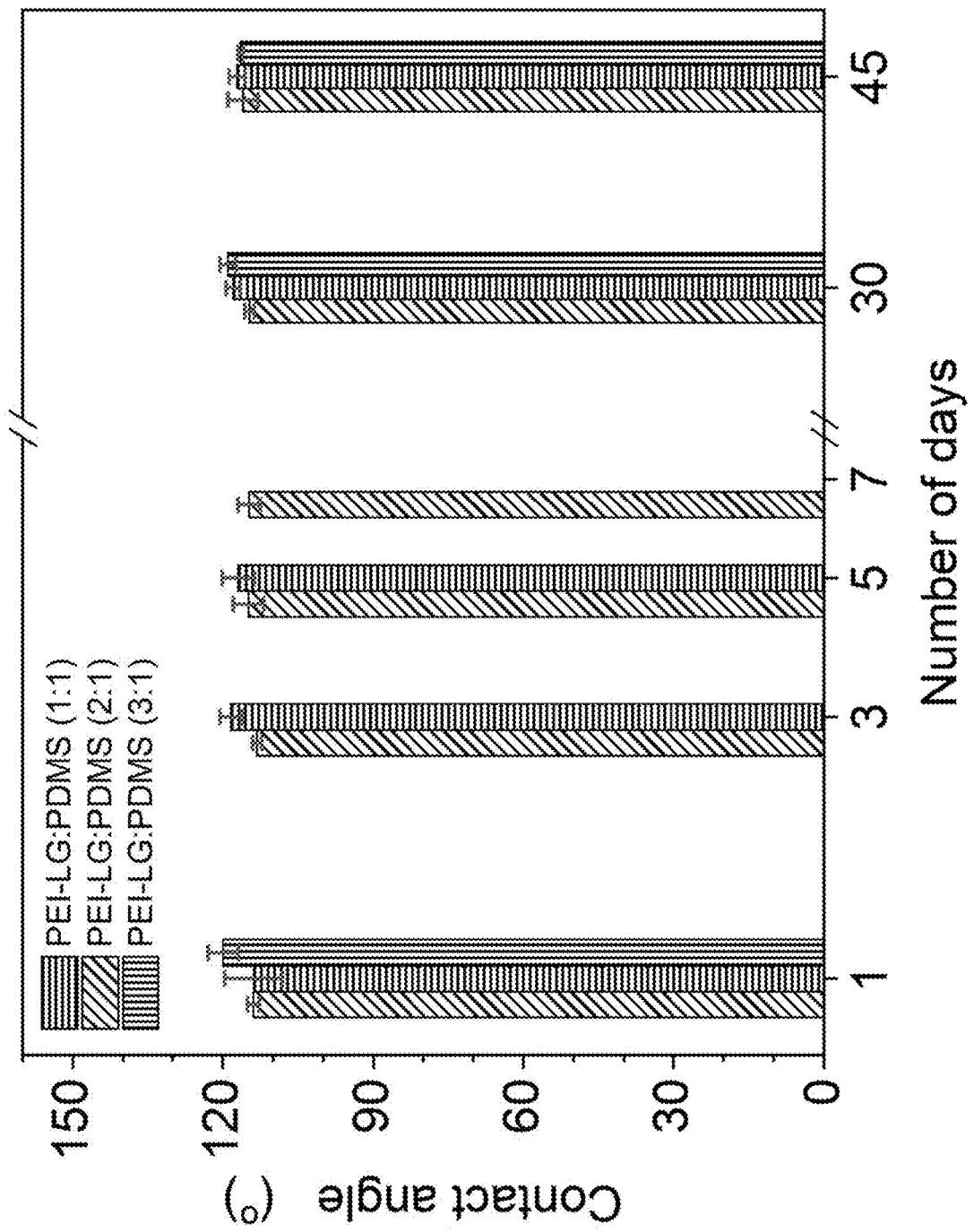
FIG. 4 shows water contact angle measurements as a function of time (in days) for an example embodiment of a coating.

Water contact angles were also measured for three different formulations of Example D over time. Specifically, the different formulations had the following ratios of sodium silicate:PDMS-OH: 1:1, 2:1, and 3:1. Water contact angles were measured after 1 day, after 3 days, after 5 days, after 7 days, after 30 days, and after 45 days of storage under ambient air condition (relative humidity of 45%-55%). Results are shown in FIG. 4. As seen in FIG. 4, the water contact angles of the coatings do not change significantly after storage for 45 days.

Water contact angles were also measured for the same formulation but with differing numbers of bilayers. For these experiments, the cationic solution contained 0.1 wt % of PEI, 0.01 wt % of PDMS-OH, and 0.01 wt % of PDMS-CH3. The anionic solution contained 0.37 wt % of LG, 0.2 wt % of PDMS-OH, and 0.1 wt % of PDMS-CH3. The above mixtures were stirred overnight and used for LbL deposition. Then either 10, 15, or 25 LbL bilayers were deposited onto a freshly cleaned silicon substrate using a custom-designed sprayer. The film coating thickness for the 10 bilayer, 15 bilayer, and 25 bilayer samples was 24 nm, 64 nm, and 100 nm, respectively.

Figure 5:
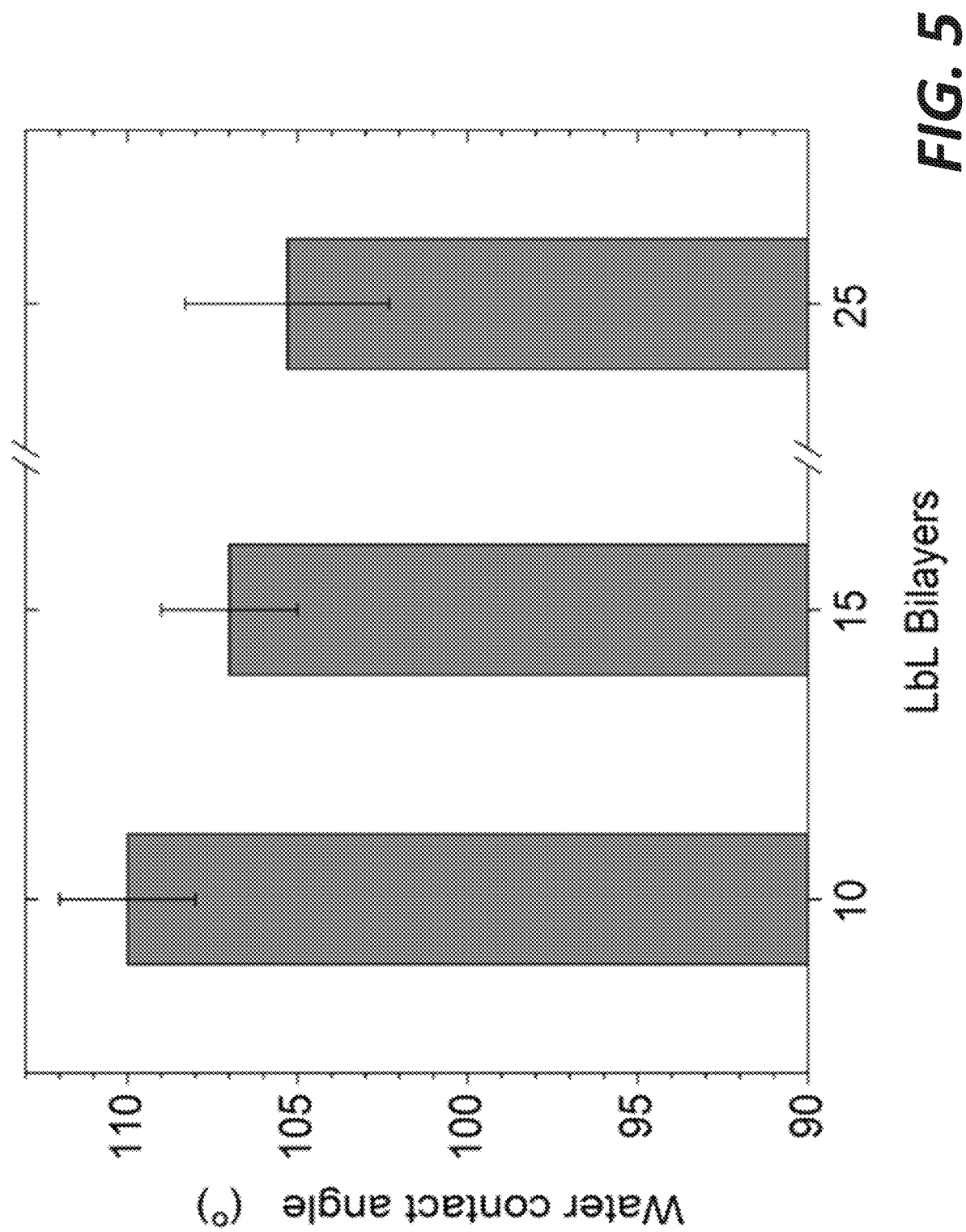
FIG. 5 shows contact angle measurements for example embodiments of coatings, where the experimental examples have differing numbers of bilayers.

Results for the three different bilayer samples tested with water samples of 25 μL are shown in FIG. 5. The water contact angle remains relatively the same irrespective of the number of LbL bilayers, i.e., 108°±2°, indicating that the coatings are hydrophobic irrespective of the number of LbL bilayers or thickness.

G. Sliding Angle Determinations

Figures 6A, 6B:
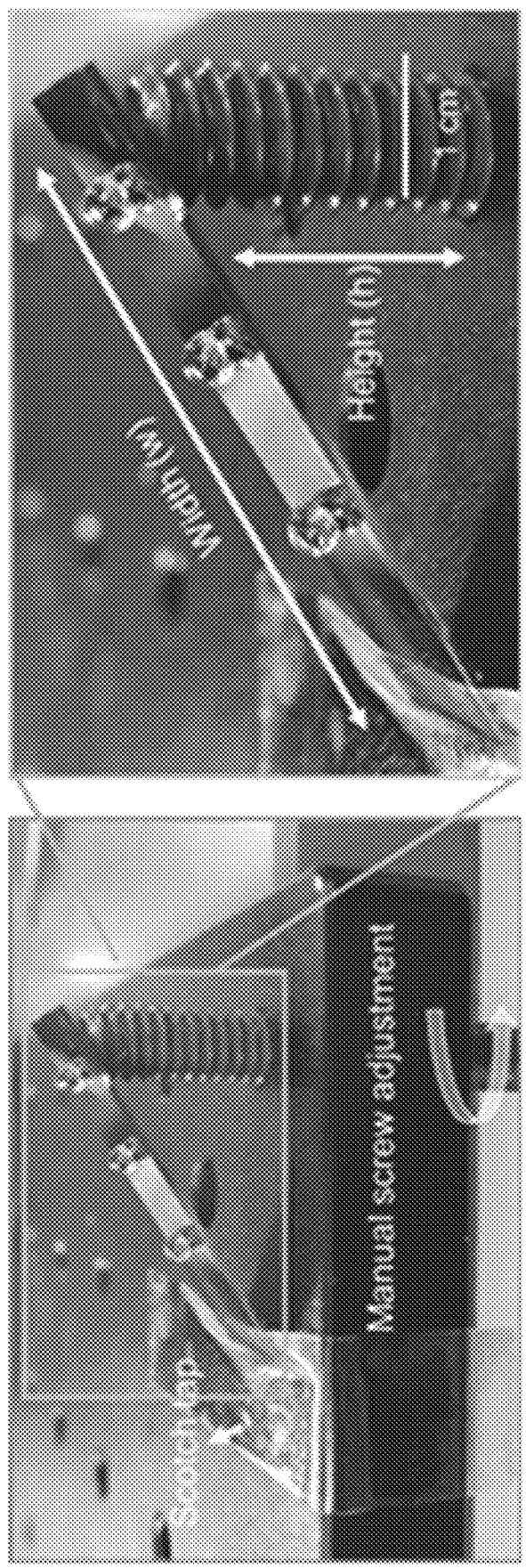
FIG. 6A shows an experimental setup for testing sliding angle.
FIG. 6B is an expanded portion of FIG. 6A.

FIG. 6A and FIG. 6B show a custom-made experimental apparatus used to determine the sliding angle of the coatings.

The apparatus shown in FIG. 6A and FIG. 6B includes a black painted steel plate and a 0.2-inch screw. Typically, the sample with a dimension of 1×4 cm$^2$ or 4×4 cm$^2$ sample was placed on top of the screw, and the other end of the sample rested on the plate. The sample height (h) was varied by adjusting the screw upward/downward as shown in FIGS. 6A and 6B, and the sliding angle was estimated by knowing the height and width using the following equation:

Sliding angle (θ)=tan$^{-1}$(height/width)

Sliding angles were also measured for the same formulation but with differing numbers of bilayers. For these experiments, the cationic solution contained 0.1 wt % of PEI, 0.01 wt % of PDMS-OH, and 0.01 wt % of PDMS-CH3. The anionic solution contained 0.37 wt % of LG, 0.2 wt % of PDMS-OH, and 0.1 wt % of PDMS-CH3. The above mixtures were stirred overnight and used for LbL deposition. Then either 10, 15, or 25 LbL bilayers were deposited onto a freshly cleaned silicon substrate using a custom-designed sprayer. The film coating thickness for the 10 bilayer, 15 bilayer, and 25 bilayer samples was 24 nm, 64 nm, and 100 nm, respectively. Water droplets of 25 µL were used for the tests.

Figure 7:
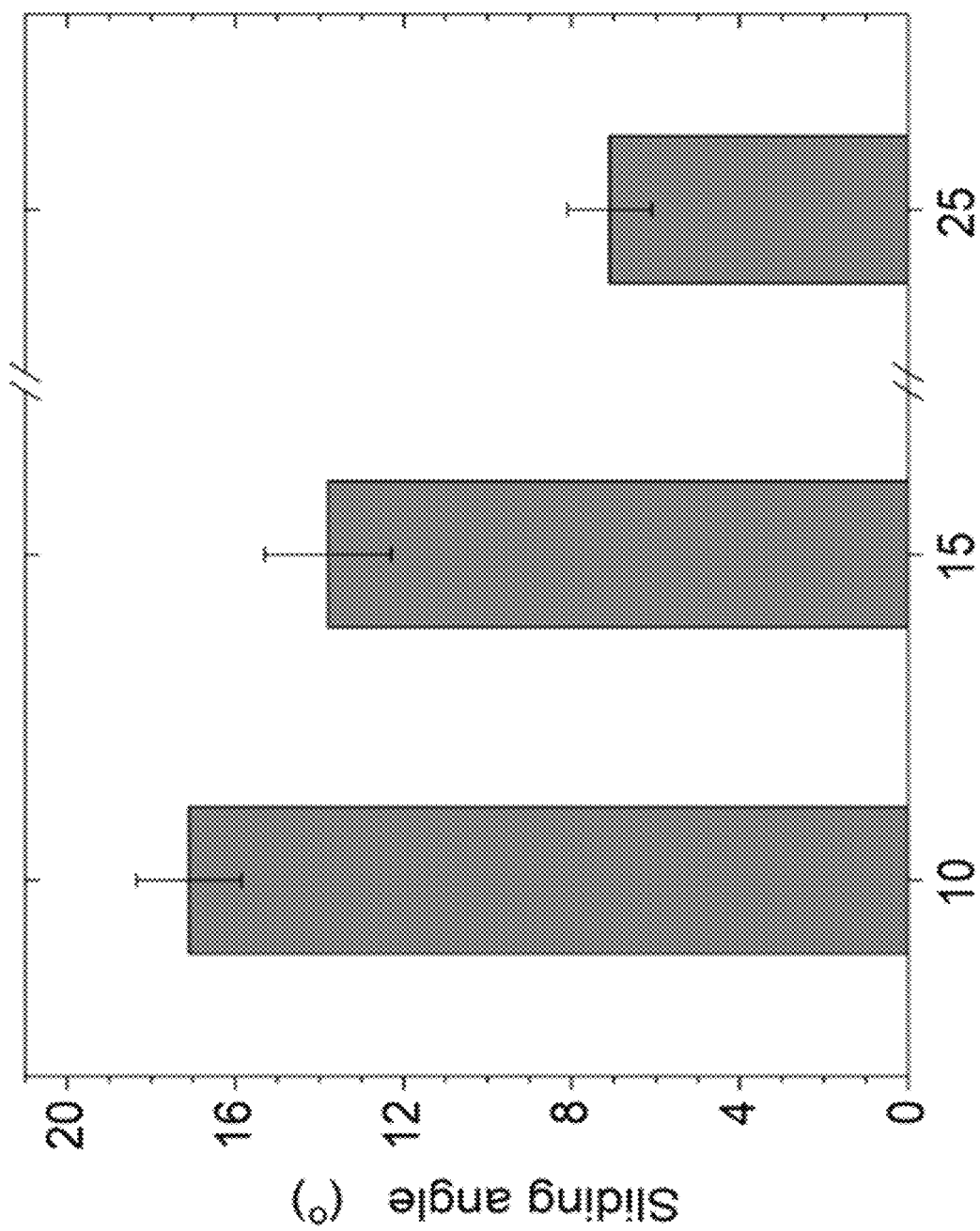
FIG. 7 shows sliding angle measurements for example embodiments of coatings, where the experimental examples have differing numbers of bilayers.

Results of the sliding angle tests are shown in FIG. 7. As shown in FIG. 7, the sliding angle (a parameter that indicates the water slipperiness) increases with decreasing the number of bilayers, i.e., sliding angle for 10 LbL bilayers is 17.1° while it is ~7° for 25 LbL bilayers, illustrating that the 25 LbL sample has better water slipperiness than the 10 LbL sample (cf. FIG. 5). Such discrepancy may be attributed to the difference in the film thickness and the amount of PDMS/PDMS-OH present in the coatings. A thicker film coating (e.g., 100 nm) may have a higher fraction of PDMS/PDMS-OH with better coverage than a thin film (e.g., 24 nm).

H. Chemical Characterization of Example D Coatings

Figure 8A:
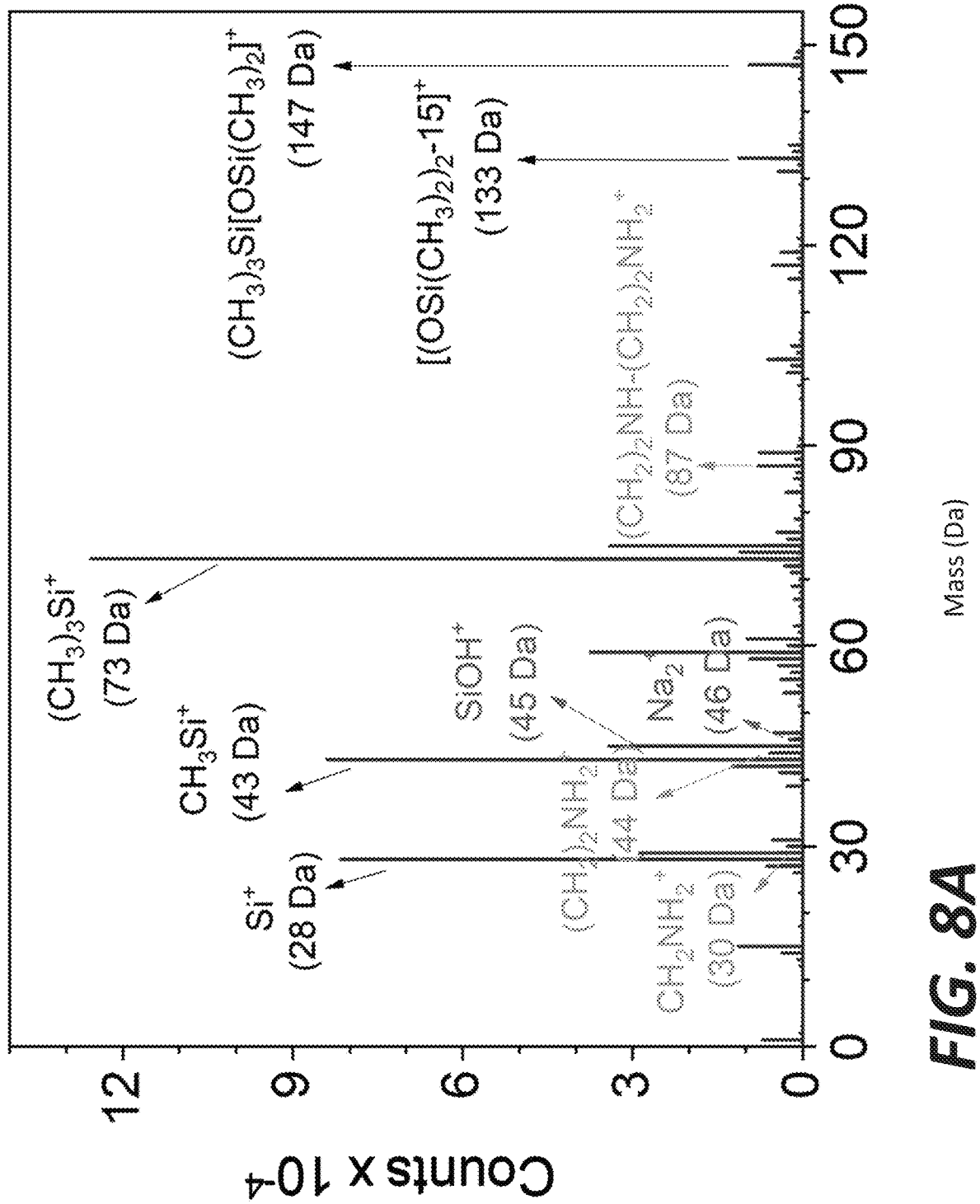
FIG. 8A shows Time of Flight-Secondary Ion Mass Spectrometry (TOF-SIMS) for an example embodiment of a coating.
Figure 8B:
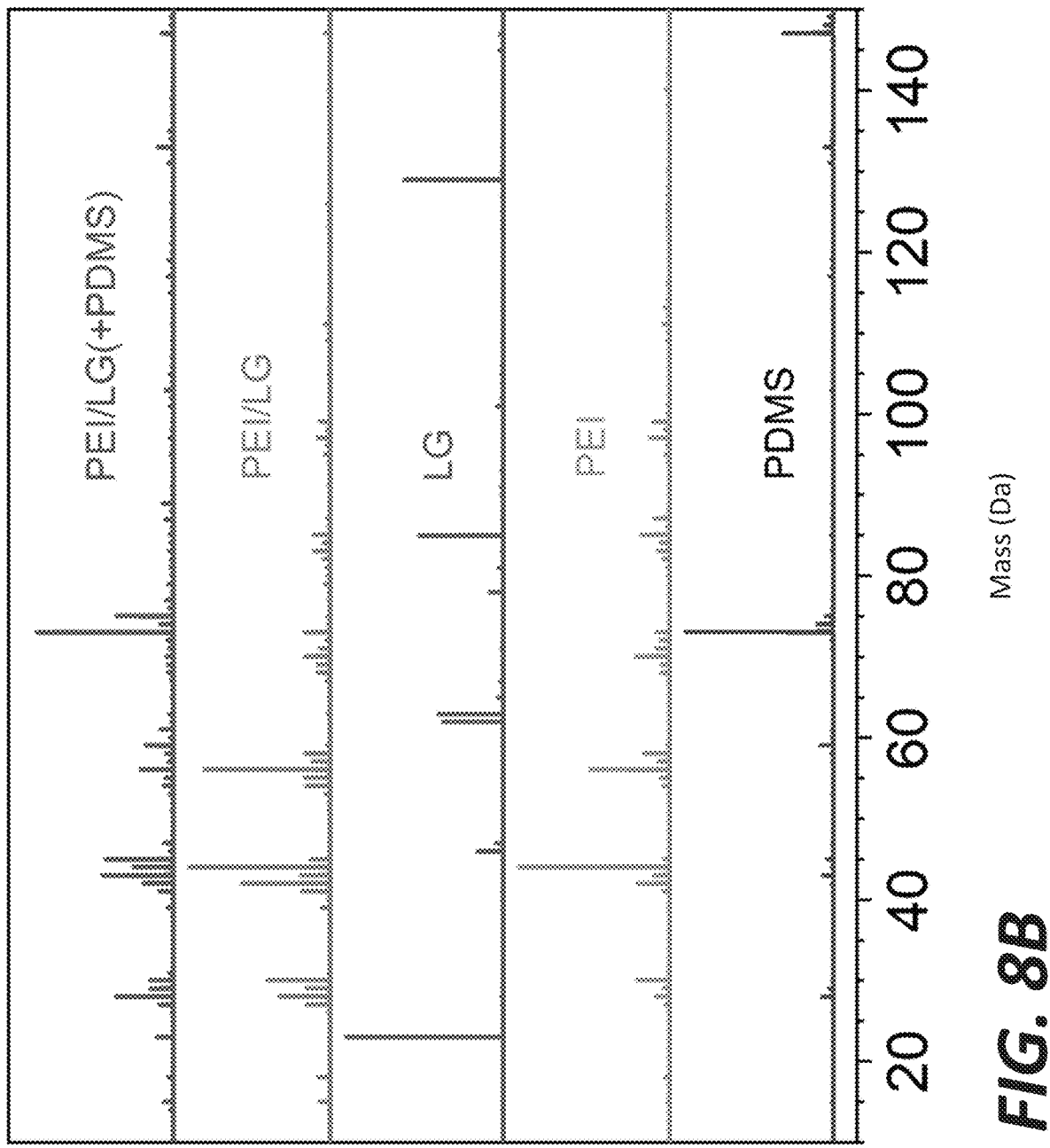
FIG. 8B are TOF-SIMS spectra for individual precursor components and PEI/Liquid Glass (LG) (without PDMS) used in the coating shown in FIG. 8A.
Figures 9A, 9B, 9C, 9D:
FIG. 9A is a photograph of sample text viewed through an uncoated glass slide.
FIG. 9B is a photograph of sample text viewed through a glass slide coated with a first example embodiment of a coating (1:1).
FIG. 9C is a photograph of sample text viewed through a glass slide coated with a second example embodiment of a coating (2:1).
FIG. 9D is a photograph of sample text viewed through a glass slide coated with a third example embodiment of a coating (3:1). The ratios 1:1, 2:1 and 3:1 represent the LG to PDMS weight ratios in the solution.

Time of Flight-Secondary Ion Mass Spectrometry (TOF-SIMS) was used to perform chemical characterization of the Example D coatings. TOF-SIMS spectra of coatings are plotted in FIG. 8A and are compared with TOF-SIMS spectra of individual precursor components used in the coating deposition in FIG. 8B. Mass fragments such as 30, 44 and 87 Da correspond to the positive ions from the PEI layer, while the mass fragment of 46 Da is due to the disodium cations present in the LG. LG shows only a few of mass fragments in the TOF-SIMS spectrum because the test only analyzed the positive ions, not the negative ions, where one would expect to see more of negative mass fragments from LG. The mass fragments such as 43, 73, 133, and 147 Da indicate the presence of PDMS in the Example D coatings. This confirms that PDMS is present in both PEI and LG layers and enables continuous pathway within the coating through which PDMS chains can populate the free surface, thus endowing slipperiness characteristics.

I. Optical Property Tests on Example D Coatings

To investigate the optical properties, glass slides with a dimension of 5×5 cm$^2$ were used and cleaned with freshly made piranha solution (i.e., 30 ml of concentrated $H_2SO_4$ and 10 ml of $H_2O_2$). The glass substrates were immersed in piranha solution for ~1 h after which the slides were thoroughly washed with DI water three times. Upon drying the slides with nitrogen gas, 25 bilayers were deposited using the Example D precursors as discussed above. The results are shown in FIG. 9A, FIG. 9B, FIG. 9C, and FIG. 9D.

Figure 10:
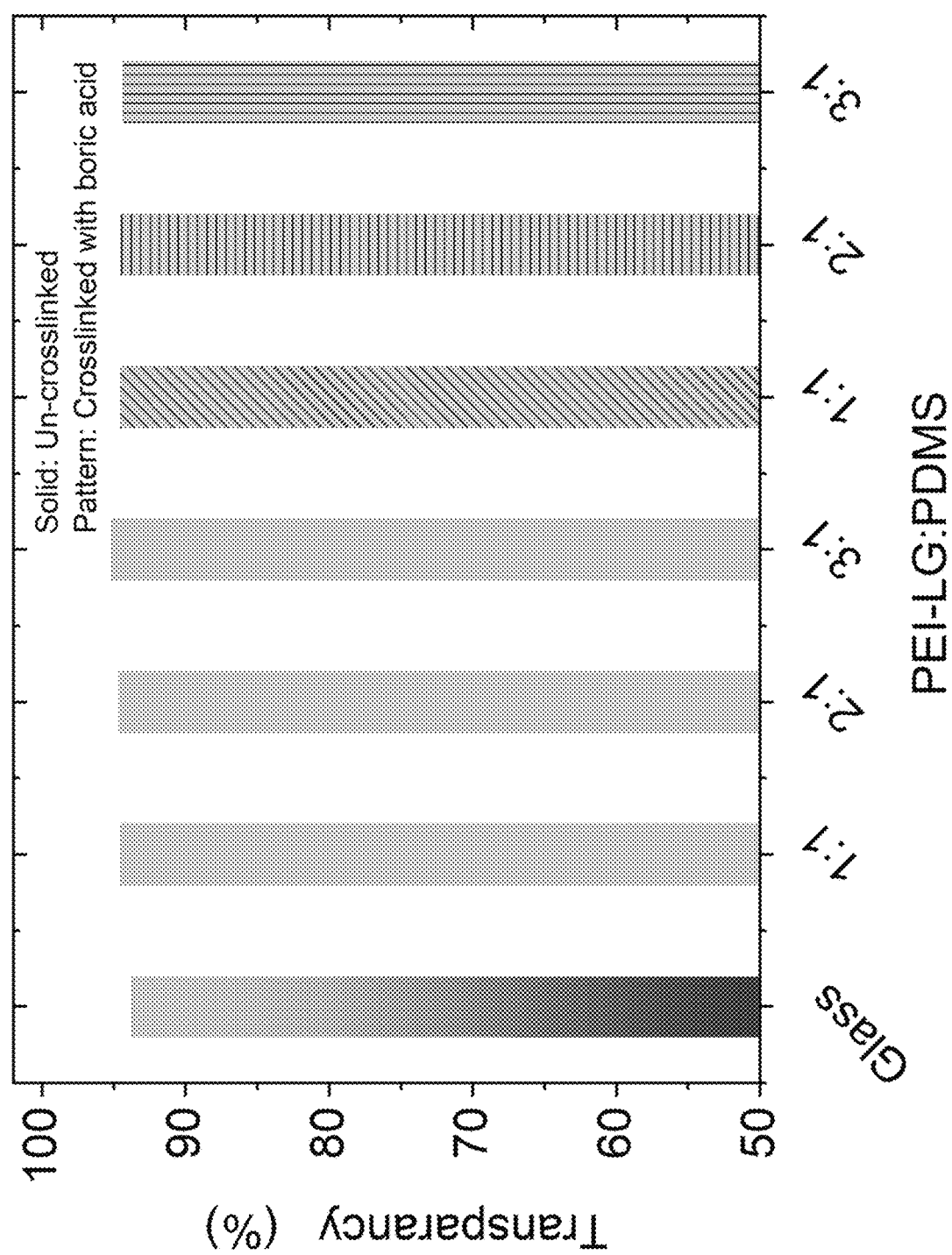
FIG. 10 shows transparency measurements for an uncoated glass slide and for glass slides coated with various example embodiments of coatings, where 1:1, 2:1 and 3:1 represent the LG to PDMS weight ratios in the solution. The solid and patterned symbols denote coatings with and without boric acid (0.01-0.05%), respectively.
Figure 11:
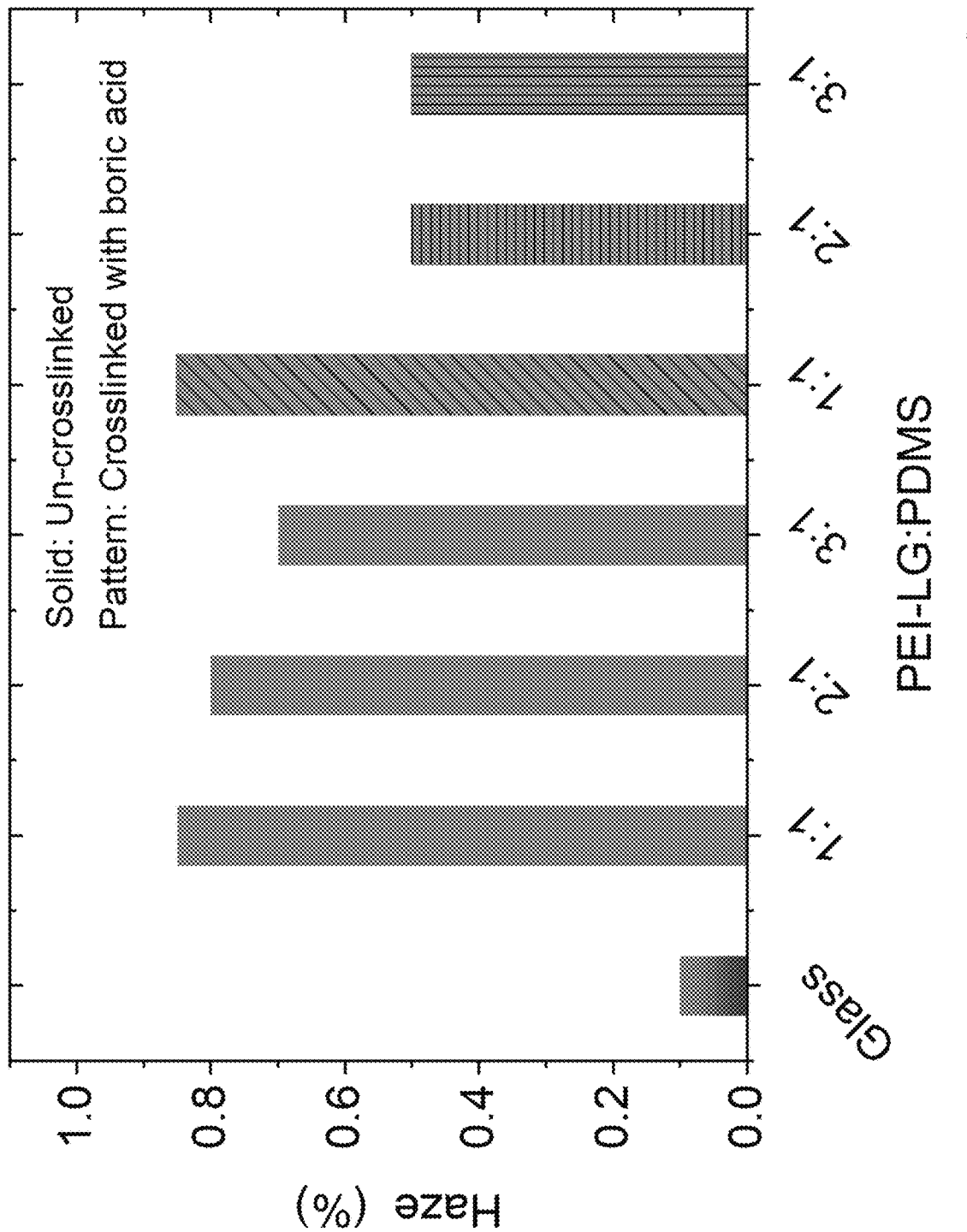
FIG. 11 shows haze measurements for an uncoated glass slide and for glass slides coated with various example embodiments of coatings. The ratios 1:1, 2:1 and 3:1 represent the LG to PDMS weight ratios in the solution. The solid and patterned symbols denote coatings with and without boric acid (0.01-0.05%), respectively.

Transparency of Example D coatings on glass substrates was also determined. Transparency measurements were obtained using UV-Vis spectroscopy. Results of the transparency tests are shown in FIG. 10, where the different Example D formulations had the following ratios of sodium silicate:PDMS-OH: 1:1, 2:1, and 3:1. The right-most three data points were coatings with boric acid (0.01-0.05 wt %). As shown in FIG. 10, the measured transparency of the layers is ~94-95% illustrating that the coatings are highly transparent in the entire visible range (i.e., λ=300-800 nm).

The haziness of the coatings was measured using a Haze-Gard plus (BYK-Gardner, Columbia, Maryland). The measurements were performed in the transparent region of the sample, typically in the middle of the sample. The results are shown in FIG. 10. The right-most three data points were coatings with boric acid (0.01-0.05 wt %).

The haziness of all films is below 1%, which increases with increasing the PDMS-OH content in the system. That is, Example D with 1:1 sodium silicate:PDMS-OH is more hazy than Example D with 3:1 sodium silicate:PDMS-OH. As mentioned earlier, the ratio of LG to PDMS-OH can play an important role in determining the quality/uniformity of the coatings. Nevertheless, the haze values below 1% make these coatings suitable candidates for architectural windows coatings or car windshield coatings.

J. Soiling and Bird Feces Adhesion Tests

Soiling and bird feces adhesion tests were also conducted on example coated substrates. The soil was collected under a tree containing various natural debris. A thick slurry of the soil was prepared (2-5 g/ml), and ~1 ml of the slurry was drop cast onto coated silicon wafers and allowed to dry overnight. The sample was thoroughly rinsed/washed with water and micrographs were captured to investigate settlement or damage to the coatings. FIG. 12A is a photograph of a sample before depositing of the slurry; FIG. 12B is a photograph after depositing the slurry; FIG. 12C is a photograph of the dry slurry; FIG. 12D is a photograph of the sample after washing.

There was no observed change in wettability (water contact angle (WCA)=117±2°) or slipperiness (sliding angle=8-16°) after treating with sand slurries, illustrating that Example D coatings exhibit anti-soiling (and self-cleaning) character. There was no observed decrease in the film thickness after washing, i.e., the film thickness is ~120±2 nm before and after the soiling test.

Figure 13A:
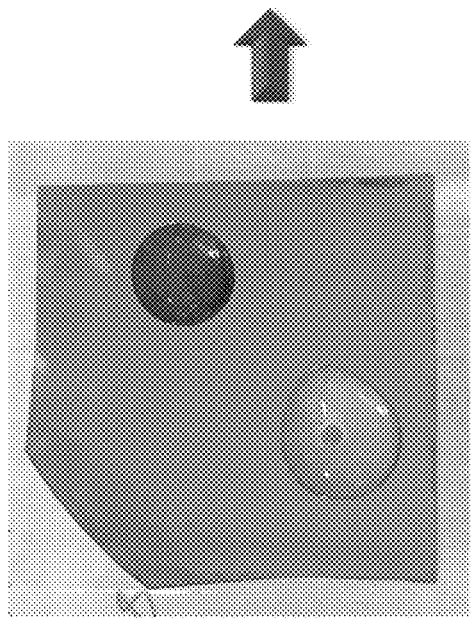
FIG. 13A is a photograph of a substrate coated with an example embodiment of a coating.
Figure 13B:
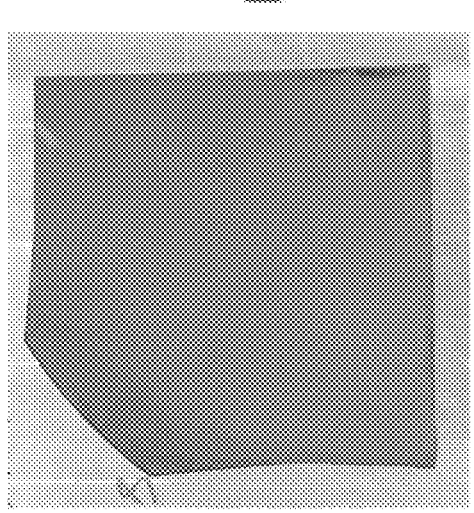
FIG. 13B is a photograph after depositing a slurry onto the substrate in FIG. 13A.
Figure 13C:
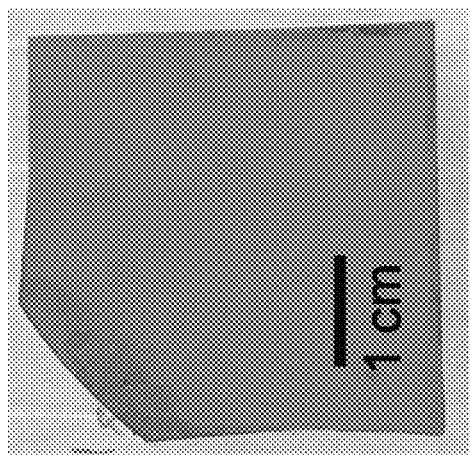
FIG. 13C is a photograph of the dry slurry in FIG. 13B.
Figure 13D:
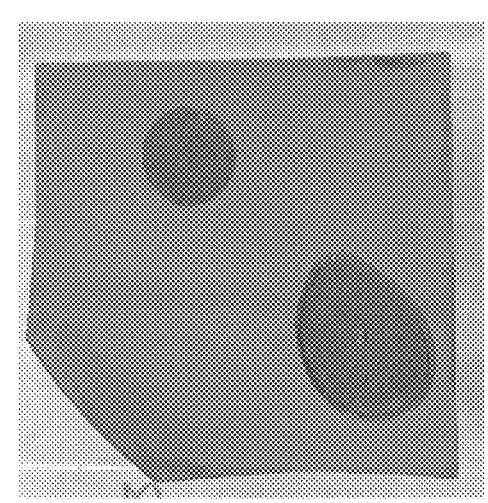
FIG. 13D is a photograph of the sample substrate after washing.

A thick slurry of pancreatin (concentration 200 mg/ml) was used to mimic bird droppings. About 0.5 mL of slurry was drop cast onto the coatings and allowed to dry overnight under ambient condition. The sample was washed with water and dried with nitrogen gas and imaged using optical microscope to probe for surface damage and the change in film thickness was measured using ellipsometry. FIG. 13A is a photograph of a sample before depositing of the slurry; FIG. 13B is a photograph after depositing the slurry; FIG. 13C is a photograph of the dry slurry; FIG. 13D is a photograph of the sample after washing.

As shown in FIG. 13D, the pancreatin was completely washed from Example D coatings upon washing with water, leaving no visual damage to the sample surface. The coatings did not show any changes either in the wettability (θ=117±2°) or film thickness (170 nm), illustrating that the coatings are not only repellent to pancreatin slurry (mimic for bird feces), but also were stable during the washing step.

Figure 14B:
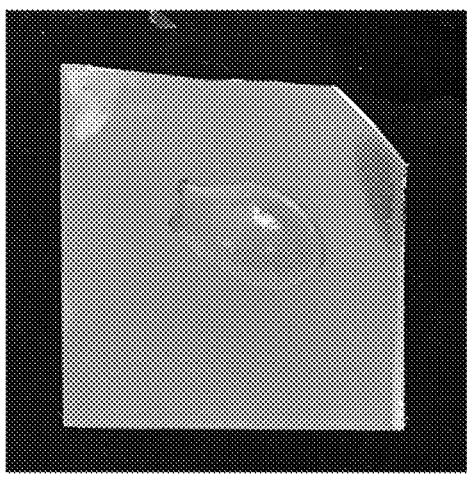
FIG. 14B is a photograph after depositing a slurry onto the substrate in FIG. 14A.
Figure 14A:
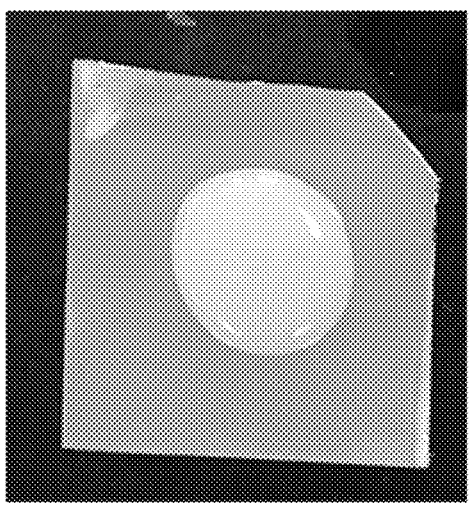
FIG. 14A is a photograph of a substrate coated with a commercially-available coating.
Figure 14D:
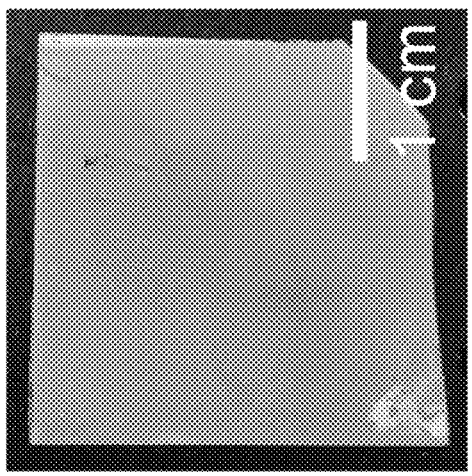
FIG. 14D is a photograph of the sample substrate after washing.
Figure 14C:
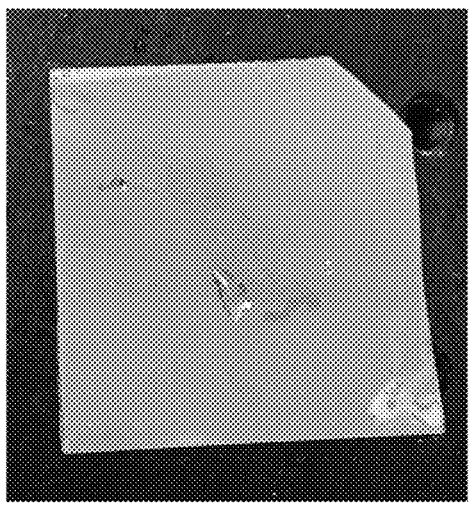
FIG. 14C is a photograph of the dry slurry in FIG. 14B.

As a comparison, the pancreatin slurry was applied to a substrate coated with commercially-available Never-Wet. The NW was sprayed onto the freshly cleaned silicon wafer, and the pancreatin slurry was drop cast onto the coatings and dried at room temperature overnight. The sample was then washed with running water and dried over nitrogen and characterized. FIG. 14A is a photograph of a Never-Wet sample before depositing of the slurry; FIG. 14B is a photograph after depositing the slurry; FIG. 14C is a photograph of the dry slurry; FIG. 14D is a photograph of the sample after washing. The Never-Wet coated sample was damaged by the pancreatin. That is, the Never-Wet coatings were partially removed during the washing step, leaving defects on the sample, which makes the sample more water wettable.

K. Scratch and Solvent Resistance Tests

Scratch resistance of the coatings was tested using Q-tips, isopropanol (to mimic Windex), KimWipes and a Dremel rotary drill equipped with felt tip at 35,000 rpm for 20 s. An optical microscope was used to evaluate damage of coatings surfaces after mechanical abrasion tests.

Figure 15A:
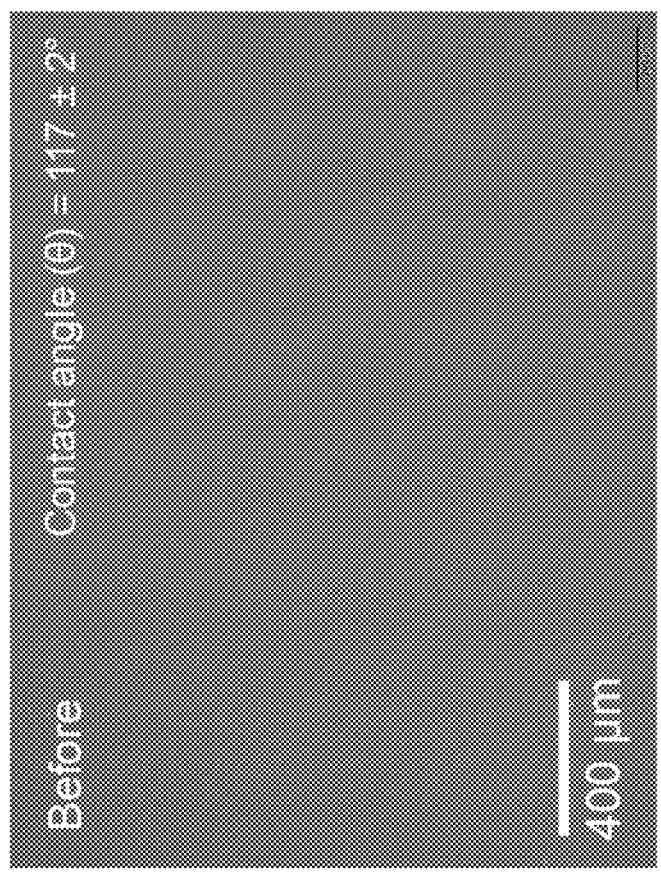
FIG. 15A is a micrograph of a substrate coated with an example embodiment of a coating.
Figure 15B:
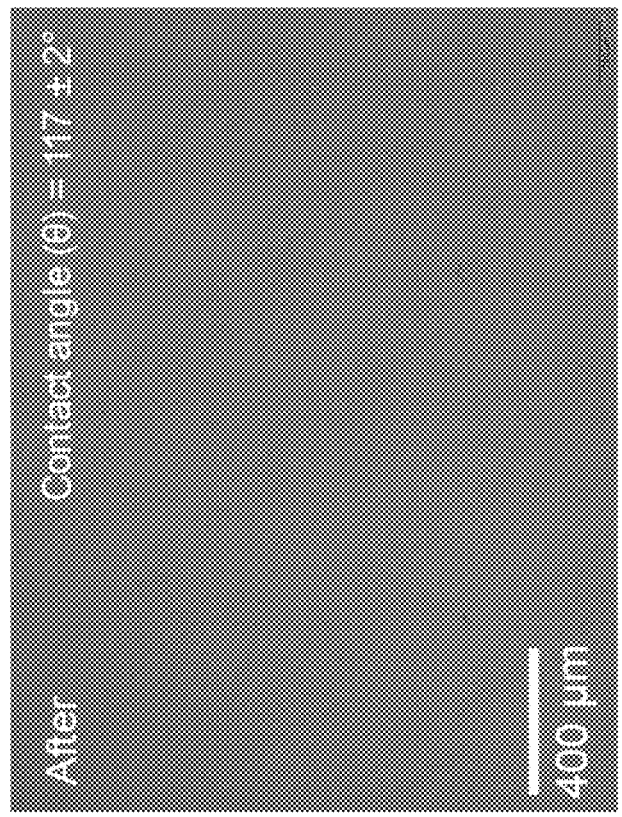
FIG. 15B is a micrograph of the coated substrate in FIG. 15A after a test with Windex and a Kim Wipe.

FIG. 15A is a micrograph taken before the test and FIG. 15B is a micrograph taken after the test with the Windex and KimWipe. There were no changes in water contact angle or slipperiness after the treatments.

Figure 16A:
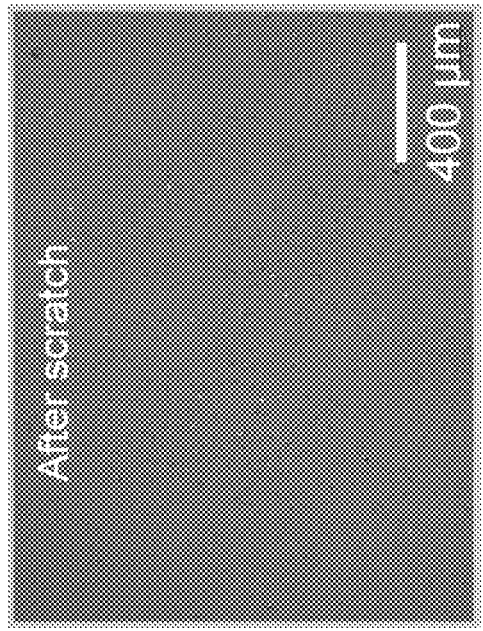
FIG. 16A is a micrograph of a substrate coated with an example embodiment of a coating.
Figure 16B:
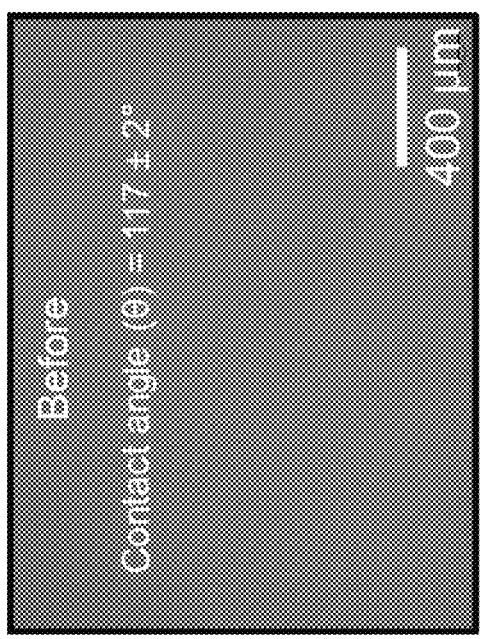
FIG. 16B is a micrograph of the coated substrate in FIG. 16A after scratching.
Figure 16C:
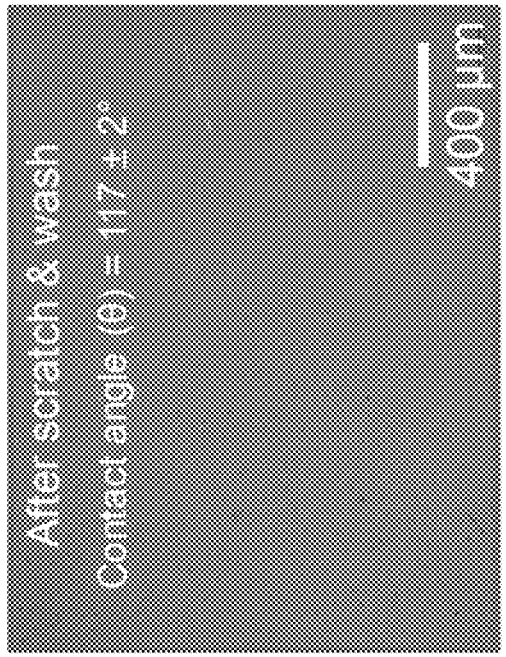
FIG. 16C is a micrograph of the coated substrate in FIG. 16A after scratching and washing.

FIG. 16A is a micrograph taken before the scratch test, FIG. 16B is a micrograph taken after scratching with the Dremel rotary drill, and FIG. 16C is a micrograph taken after washing and scratching. Pieces of wool dust were left on top of the coatings after scratching. Those wool dust pieces were completely removed after washing with running water, leaving no visible scratches on the surface.

In addition, the wettability and slipperiness of the layers after each scratch treatment were evaluated. Our coatings retained their hydrophobicity and slipperiness even after such harsh treatments with solvents and strong mechanical force applied to the coatings.

The durability of the Example D coatings was tested using glass cleaning soap solution. The sample was vigorously shaken in a glass cleaning detergent solution and rinsed with running water. Upon drying the sample, wettability and slipperiness of the layers were examined. There were no significant changes either in the wettability or slipperiness illustrating that these coatings are durable against a detergent solution.

L. Mechanical Property Tests

Pencil hardness tests were performed according to the American Standard Testing Method (ASTM)-D3363-05 using a set of TOISON D'OR 1900 pencils with hardness: 9B through 9H, where the 9B being the softer, while 9H being the hardest pencil. Briefly, approximately 5 to 6 mm (3/16 to 1/4 in.) of wood was removed from the point of each pencil using a draftsman-type mechanical sharpener, being careful to leave an undisturbed, unmarked, smooth cylinder of lead. Holding the pencil holder (when using drawing leads) at an angle of 90° to the abrasive paper, rub the lead against the paper maintaining an exact angle of 90° to the sandpaper (P-400, X-fine finishes) sand until a flat, smooth and circular cross-section is obtained, free of chips or nicks in the edge of the cross-section.

Figure 17:
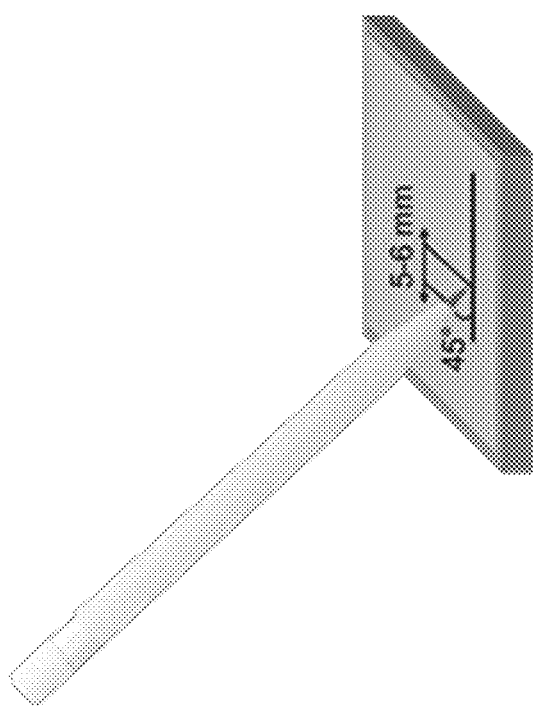
FIG. 17 is a schematic illustration of pencil orientation during pencil hardness tests (TOISON D'OR 1900 pencils scratched at an angle of 45° relative to the vertical).
Figure 18A:
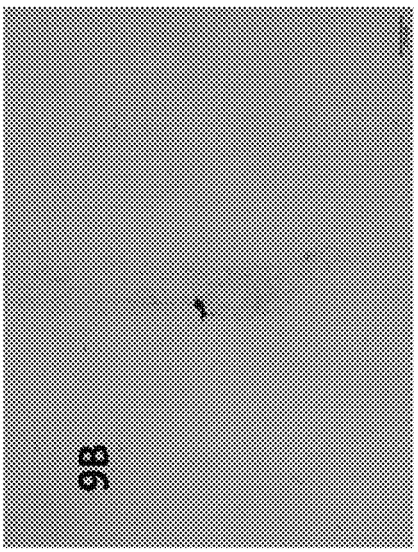
FIGS. 18A-18F are optical micrographs of the surface of a substrate coated with an example embodiment of a coating, after scratching with different pencils (TOISON D'OR 1900 pencils with hardness of 9B, 3B, B, HB, 3H, and 7H).
Figure 18B:
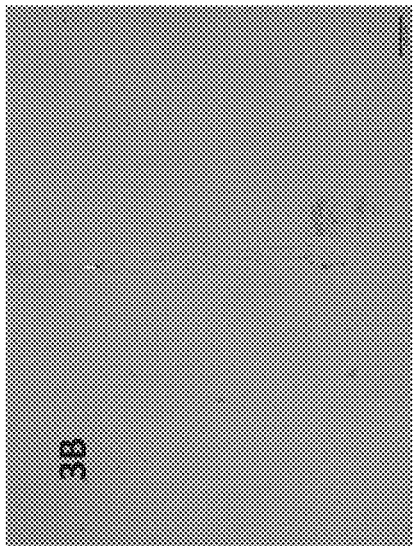
Figure 18C:
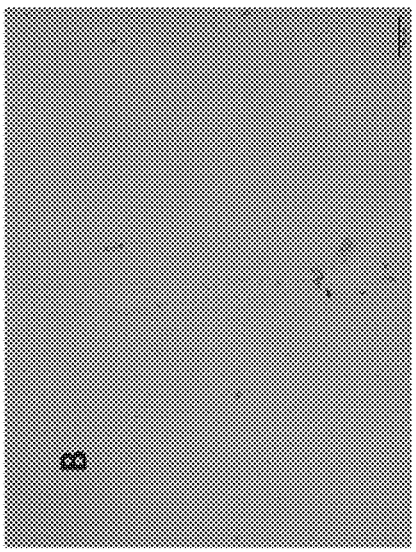
Figure 18D:
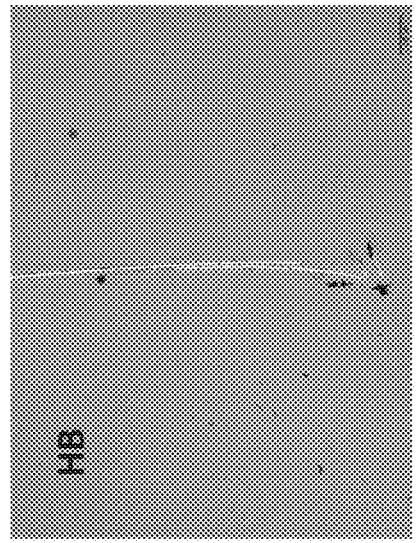
Figure 18F:
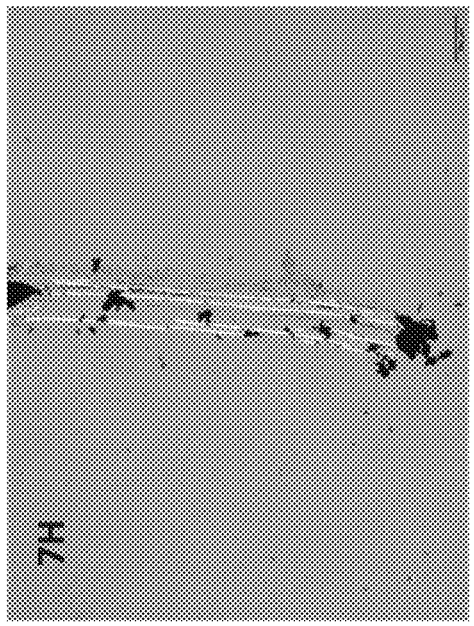
Figure 18E:
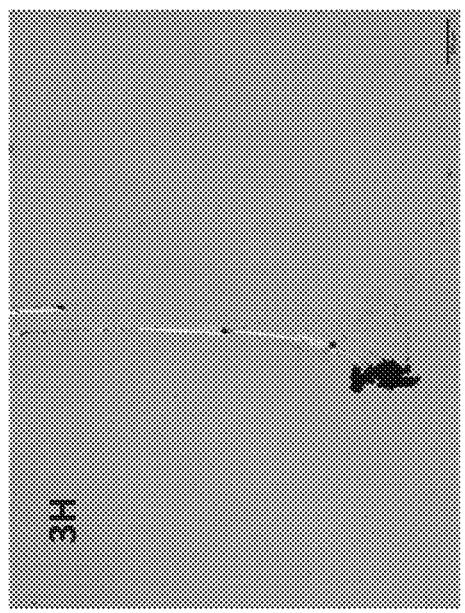

During the tests, the pencil was held firmly against the film at a 45° angle (point away from the operator) and pushed away from the operator in a 6.5-mm (1/4-in.) stroke. FIG. 17 is a schematic illustration of the pencil orientation during tests. The process started with the hardest pencil and continued down the scale of hardness to either of two endpoints: (i) the pencil that will not cut into or gouge the film (pencil hardness), or (ii) the pencil that will not scratch the film (scratch hardness).

FIGS. 18A-18F are optical micrographs of the tests of Example D coatings with a 3:1 ratio of sodium silicate: PDMS-OH after scratching with different pencils. The optical micrographs shown in FIG. 18A-18F were obtained at 5× magnification. The hardness of the pencil used during the tests increases from FIG. 18A to FIG. 18F. The results in FIGS. 18A-18F indicate that coatings exhibit HB pencil gouge hardness (i.e., the hardest pencil that will leave the film uncut for a stroke length of at least 3 mm (1/8 in.)) and B pencil scratch hardness (i.e., the hardest pencil that will not rupture or scratch the film).

M. Chemical Characterization of Example E Coatings

Figure 19A:
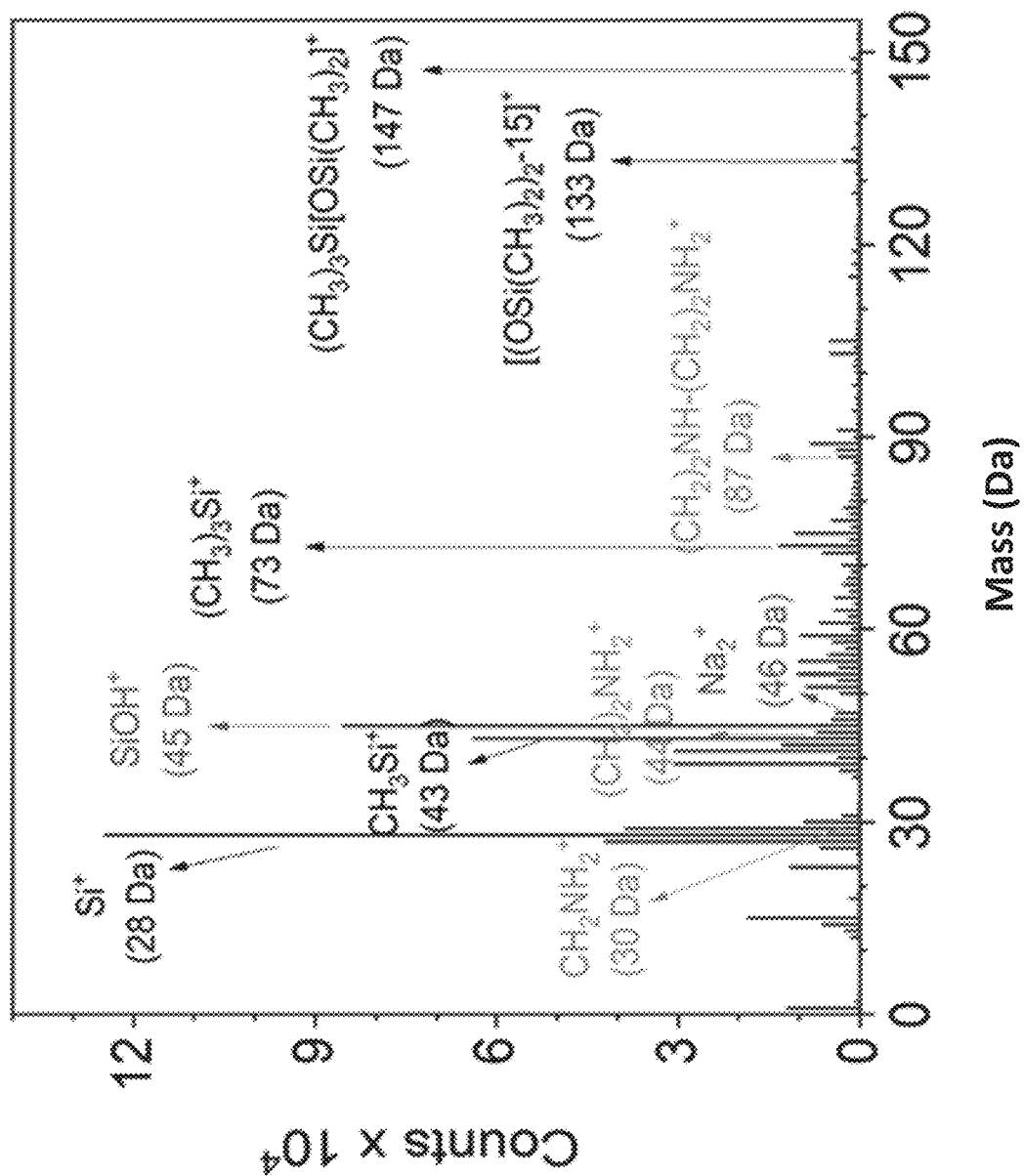
FIG. 19A shows Time of Flight-Secondary Ion Mass Spectrometry (TOF-SIMS) for an example embodiment of a coating.
Figure 19B:
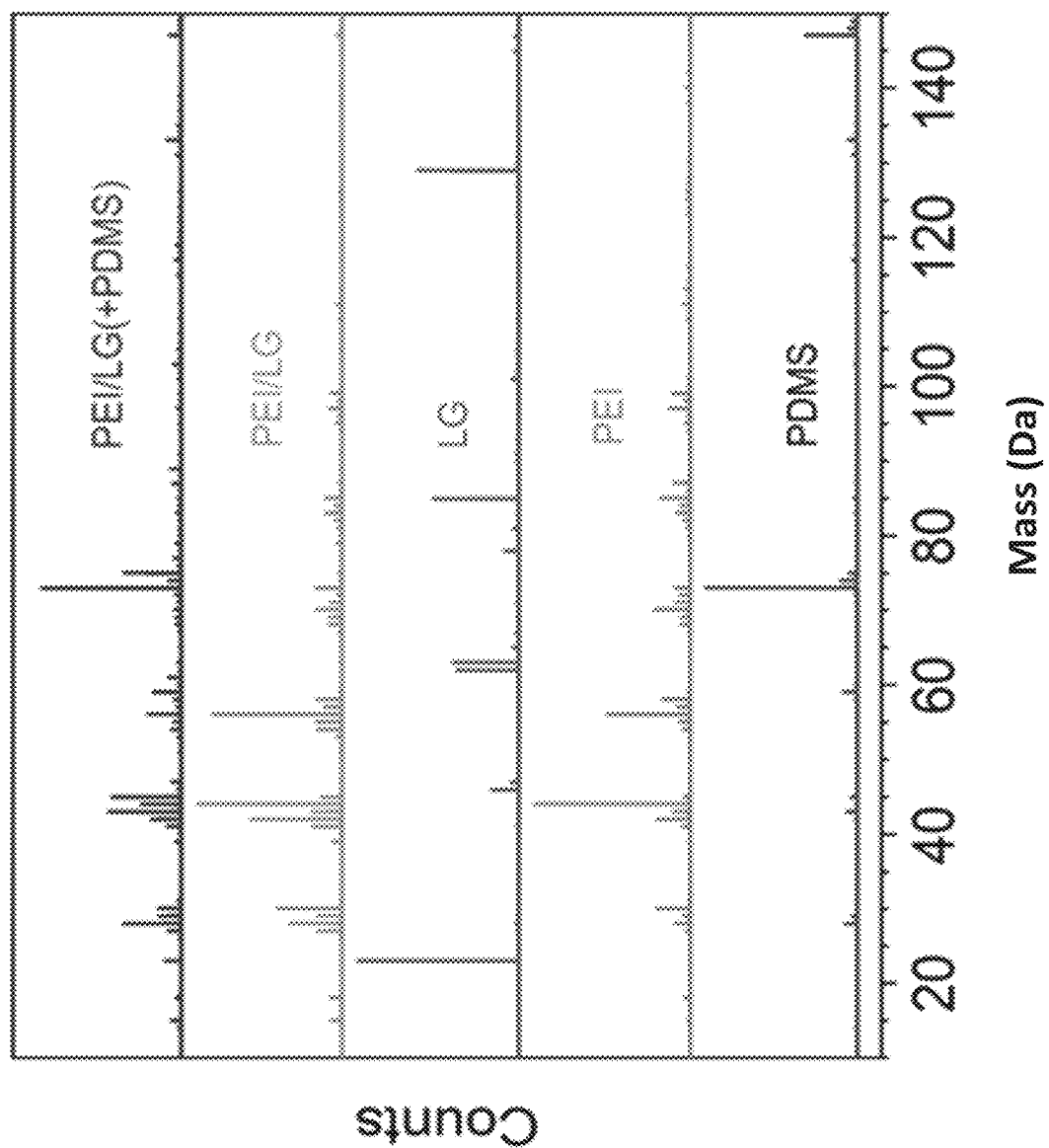
FIG. 19B are TOF-SIMS spectra for individual precursor components used in the coating shown in FIG. 19A.

Time of Flight-Secondary Ion Mass Spectrometry (TOF-SIMS) was used to perform chemical characterization of the Example E coatings. TOF-SIMS spectra of coatings are plotted in FIG. 19A and are compared with TOF-SIMS spectra of individual precursor components used in the coating deposition in FIG. 19B.

Mass fragments such as $CH_2NH_2^+$ (30 Da), $(CH2)_2NH_2^+$ (44 Da), and $(CH_2)_2NH(CH_2)_2NH_2^+$ (87 Da) correspond to the positive ions from the PEI layer, while the mass fragment of Si—OH$^+$ (46 Da) is due to sodium present in the LG. As expected, LG shows only a few mass fragments in the spectrum since we only analyzed the positive ions, not the negative ions, where one would expect to see more negative mass fragments (please refer to $2^{nd}$-year annual review presentation for details) from LG. The reason why we studied positive ions is that PDMS and PEI exhibit more positive than negative fragments. The mass fragments such as Si$^+$ (43 Da), $(CH_3)_3Si^+$ (73 Da), and $(CH_3)_3Si[OSi(CH_3)_2]^+$ (147 Da) indicate the presence of PDMS in the Example D LbL film. TOF-SIMS confirms the presence of PDMS in the LbL film, and thereby endowing slipperiness characteristics.

N. Deposition of Example E Coatings on PET Substrates

Example E coatings were deposited on polyethylene terephthalate (PET) films (thickness ~1,000 μm) received from Eastman Chemical Company. First, the PET films were sonicated in ethanol and de-ionized water in succession for ten minutes in each solution and dried with nitrogen flow. The PEI (10 mg/ml in ethanol) solution was spun cast (2,500 rpm for 30 s) on the above PET film, and the specimen was annealed at 140° C. for 2 hours. The sample was then thoroughly extracted in ethanol overnight and dried with nitrogen flow, and then used for LbL deposition.

Then 25 LbL bilayers were deposited on PEI-coated PET film and characterized systematically. A change in wettability was measured as the PET surface was modified. For example, virgin PET shows wettability of ~70-75° denoting a moderately hydrophobic surface, which becomes wettable after the PEI deposition, i.e., measured water contact angle is <10° due to the presence of positively charged amino groups in PEI. Because the surface of the PET is positively charged, a negatively charged LG layer was first deposited and then continued with a sequential deposition of LbL bilayers on the PET substrate. Upon drying the sample, the measured water contact angle was 125°, illustrating that the coating becomes hydrophobic. The sliding angle of the film was ~10°, which confirms the slipperiness of the deposited layers on PET.

O. Chemical Characterization of Example E Coatings on PET Substrate

Figure 20A:
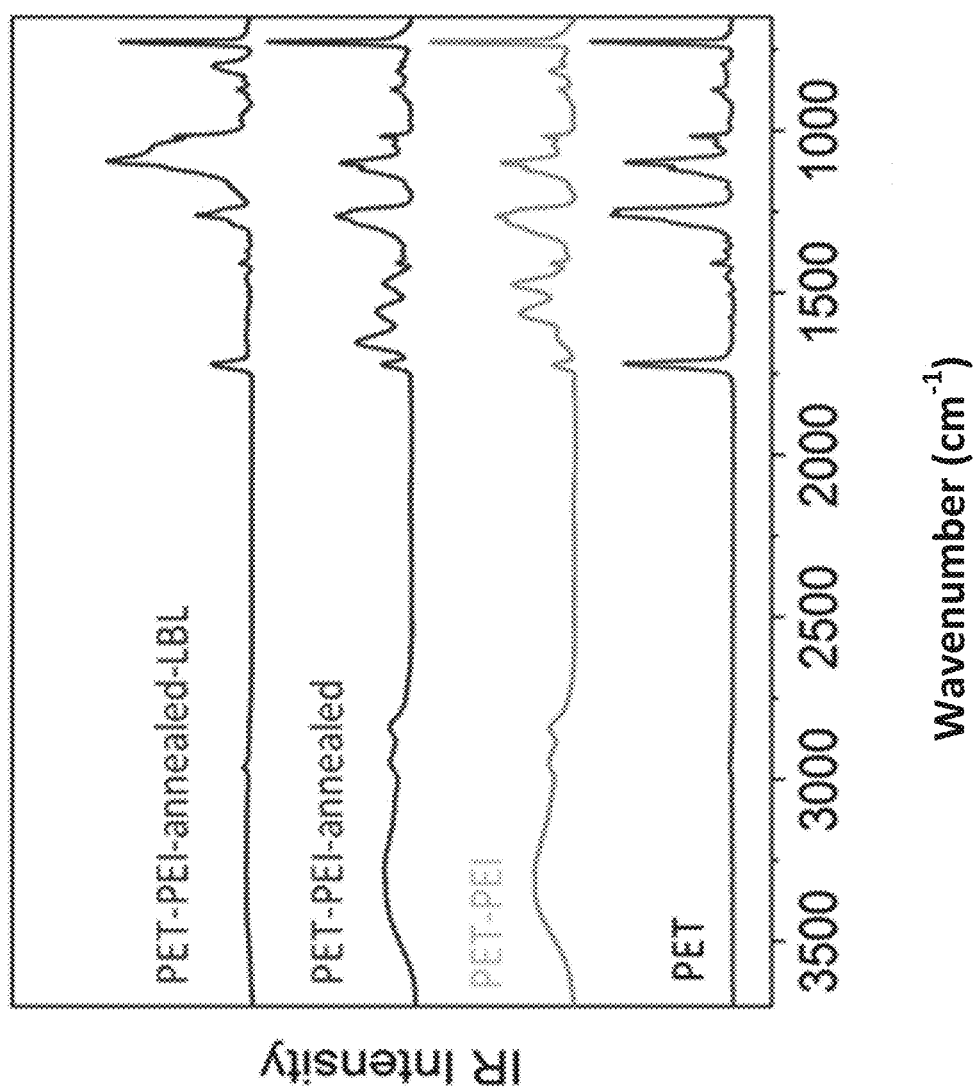
FIG. 20A shows attenuated total internal reflection infrared spectroscopy (ATR-FTIR) for PET, PET-PEI, PET-PEI annealed, and PET-PEI annealed-LbL films.

An attenuated total internal reflection infrared spectroscopy (ATR-FTIR) was employed to investigate the chemical composition of the LbL film coating deposited on the PET substrate. FIG. 20A presents the ATR spectra of PET, PET-PEI, PET-PEI annealed, and PET-PEI annealed-LbL films. PET shows a stretching vibration of carbonyl vibration at 1721 cm$^{-1}$ (C=O), oxygen-carbon stretching at 1261

$cm^{-1}$ (C—O—C), carbon-carbon stretching at 1093-1047 $cm^{-1}$ (O—C—C), and a C—H deformation at 725 $cm^{-1}$ (C—H).

After depositing a thin layer of PEI on PET (see the PET-PEI spectrum in FIG. 20B), firstly, the intensity of carbonyl stretching from PET decreased. Secondly, a broad N—H stretching of primary (1°) and secondary (2°) amines appears in the region of 3100-3400 $cm^{-1}$. Also, the peaks at 1557 cm-1, 1470 $cm^{-1}$ are attributed to the N—H bending vibrations of 1° amine, and a peak at 797 $cm^{-1}$ stems from the N—H wag of 1° and 2° amines present in PEI.

Figure 20B:
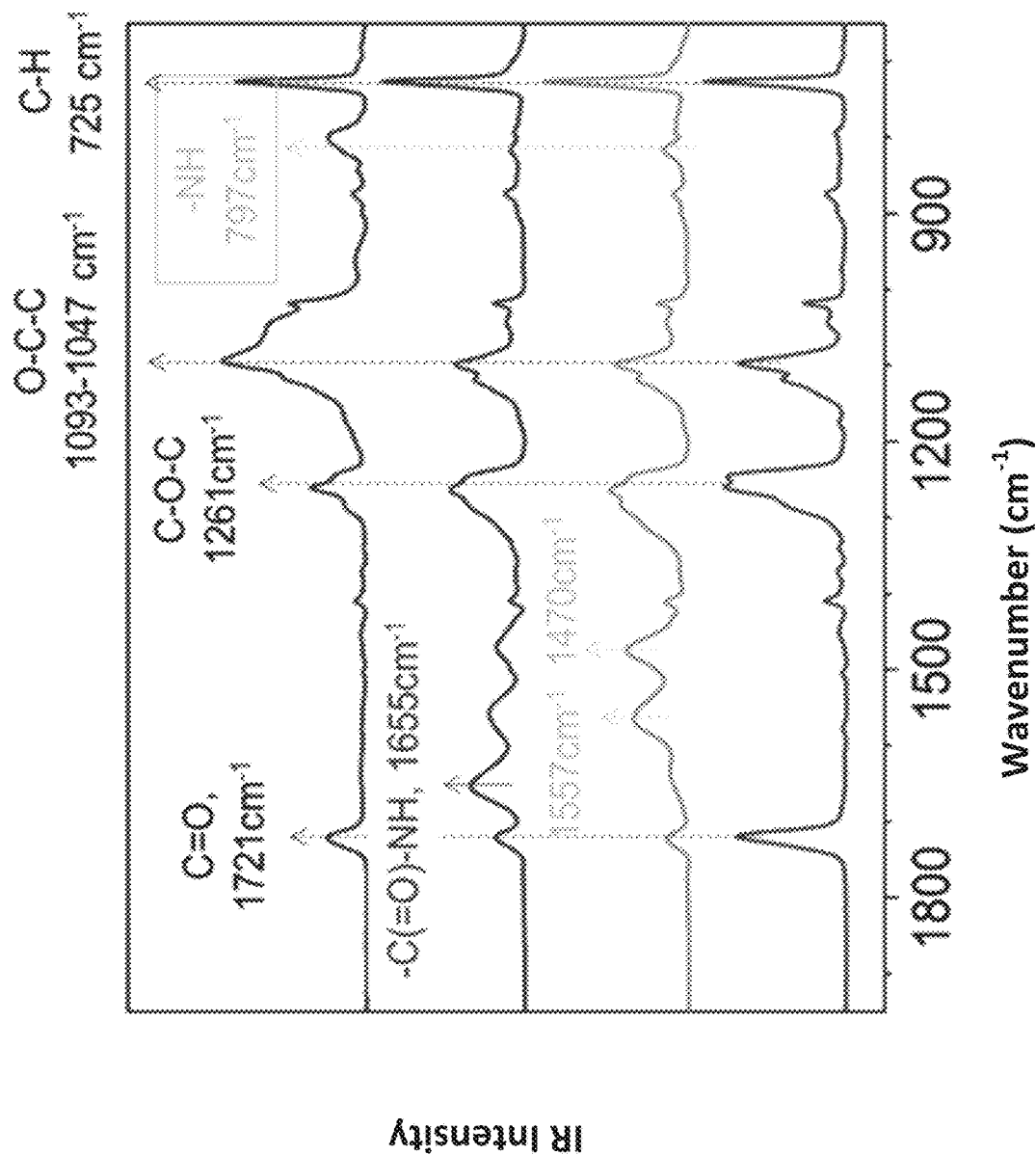
FIG. 20B shows the fingerprint region of the full spectra shown in FIG. 20A.

Upon heating the PET-PEI layers at high temperature (140° C. for 2 hours), the 1° and 2° amines (from PEI) react with the ester groups in PET resulting in the formation of amide bonds at the interface of PET/PEI (i.e., an amidation reaction occurs), which is confirmed by the appearance of amide stretching at 1655 $cm^{-1}$ (—NH—CO—) in the ATR spectrum (see red spectrum in FIG. 20B). Another interesting aspect of FIG. 20 is the disappearance of the amide peak after depositing 25 bilayers of LbL film coating, which is another indication that the PET surface has been modified as well as deposited the Example E coatings. Furthermore, TOF-SIMS spectra show the presence of PDMS and thus confirm the slipperiness of the coatings.

P. Deposition of Example E Coatings on Polyurethane (PU) Substrates

Example E coatings were deposited on polyurethane (PU) films received from Eastman Chemical Company. Firstly, the PU film was washed with ethanol and deionized water by sonicating for 10 minutes then dried with nitrogen flow. After cleaning, the film was then exposed to oxygen ($O_2$) plasma for two minutes that made the surface of the PU film more wettable (compared to virgin PU because of the formation of surface hydroxy groups on the surface) and used as such for LbL deposition.

The virgin PU film showed a water contact angle (WCA) of 72°, which decreased to 40° after oxygen plasma, indicating that the surface becomes hydrophilic. Upon depositing 25 LbL bilayers on PU, the WCA increased to 106°, which appears to be consistent with previous results of Example E coatings on silica and PET substrates. A low sliding angle of around 9° confirms that the coated substrates are slippery.

Q. Chemical Characterization of Example E Coatings on PU Film

Figure 21A:
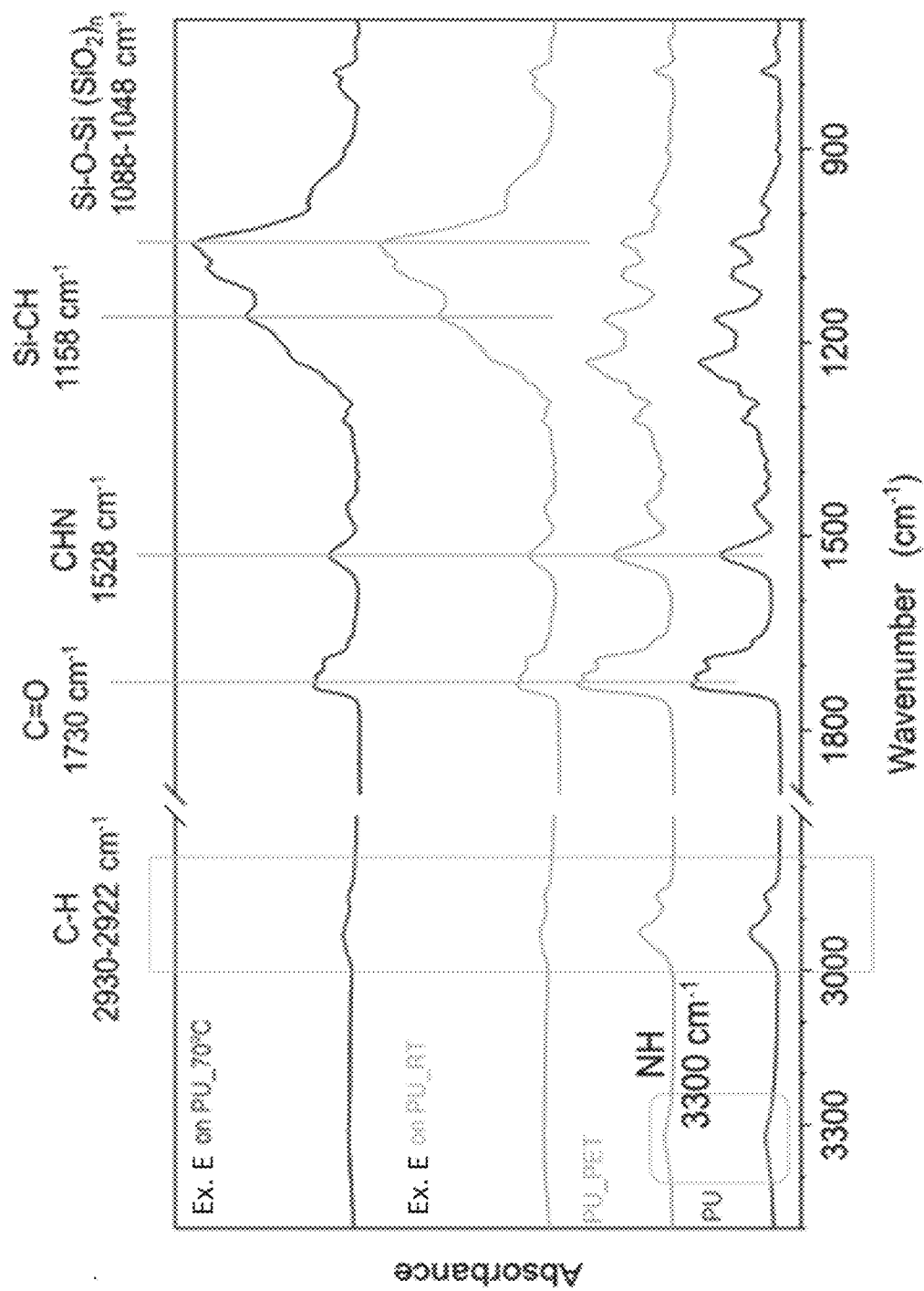
FIG. 21A shows attenuated total internal reflection infrared spectroscopy (ATR-FTIR) for Example E coatings on a polyurethane film.

ATR-FTIR spectroscopy was used to examine the chemical composition of LbL bilayers deposited on the PU film. FIG. 21A presents the ATR spectra of PU, PET-PU, Example E on PU-RT, and Example E on PU-annealed. Both PU and PET-PU shows a stretching vibration of carbonyl bond at 1730 $cm^{-1}$ (C=O) and secondary amide stretching at 1528 $cm^{-1}$ (C—NH—C=O). The film received from Eastman Chemical Company had two layers, i.e., top PU and bottom PET (used as a support for PU).

Figure 21B:
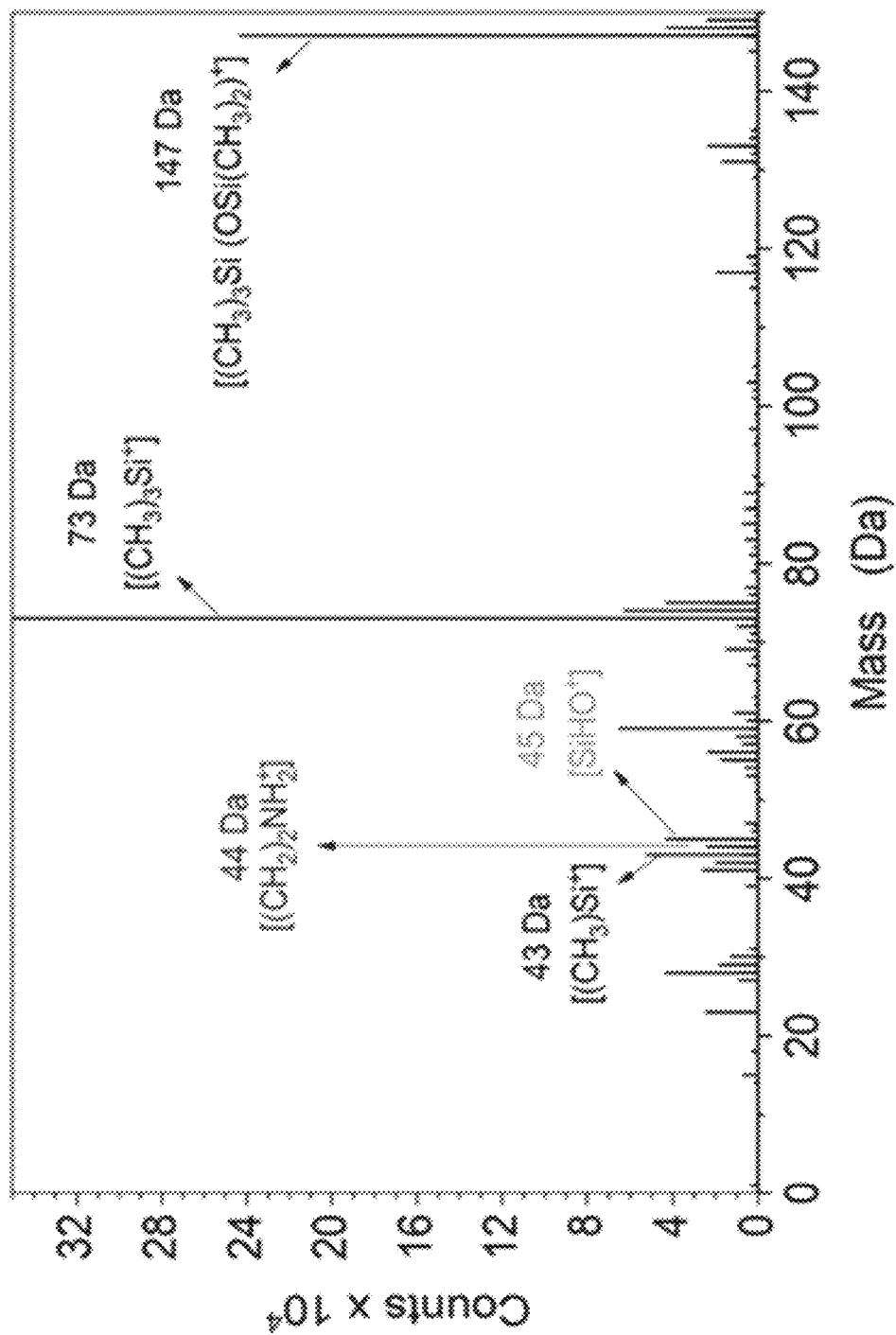
FIG. 21B shows Time of Flight-Secondary Ion Mass Spectrometry (TOF-SIMS) for the Example E coating on a polyurethane film.

For a simple comparison, we ran ATR-FTIR first on pure PU layer (detached from PET) and the one received as such, i.e., PET at the bottom, where the top PU is scanned under ATR mode to record the FTIR spectrum. After depositing 25 LbL bilayers on PU, the coatings exhibit new stretching frequencies at 1158 $cm^{-1}$ (Si—CH), and 1088-1048 $cm^{-1}$ (Si—O—Si) that originate from PDMS or liquid glass (anion). Because the ATR cannot distinguish between the two layers, we ran TOF-SIMS, which confirmed the presence of PDMS in the coatings and thus ensured the slipperiness of the deposited layers on PU (shown in FIG. 21B).

R. Mechanical Properties of Example E Coatings on PU Film

The hardness of Example E coatings deposited on PU was investigated according to the American Standard Testing Method ASTM-D3363-05 using a set of TOISON D'OR 1900 wood pencils. The pencil was held firmly against the film at a 45° angle (point away from the operator) and pushed away from the operator in a 6.5-mm (¼-in.) stroke. The process was started with the hardest pencil (7H) and continued down the scale of hardness.

Figure 22A:
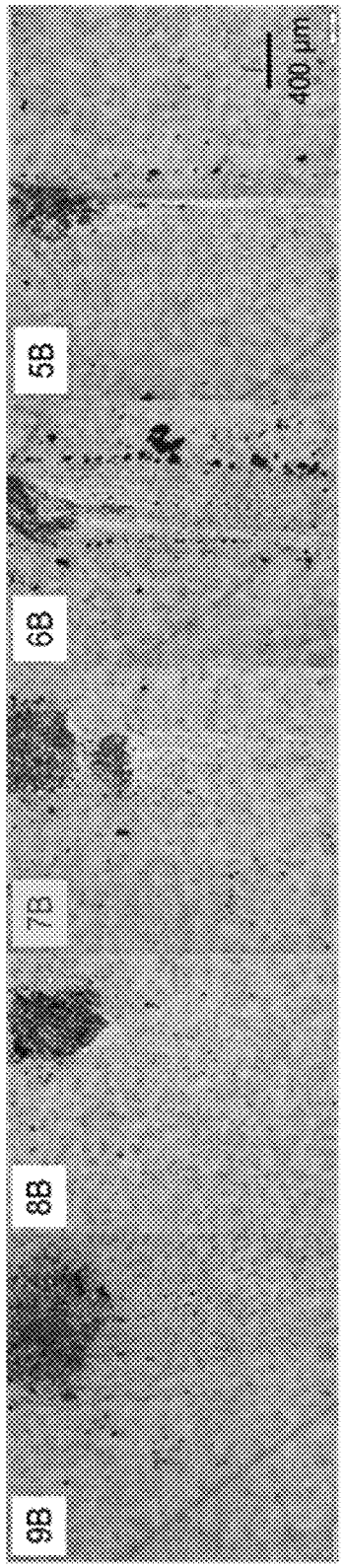
FIG. 22A are optical micrographs of the surface of an uncoated polyurethane film after scratching with different pencils (TOISON D'OR 1900 pencils with hardness of 9B, 8B, 7B, 6B, 3H, and 7H).
Figure 22B:
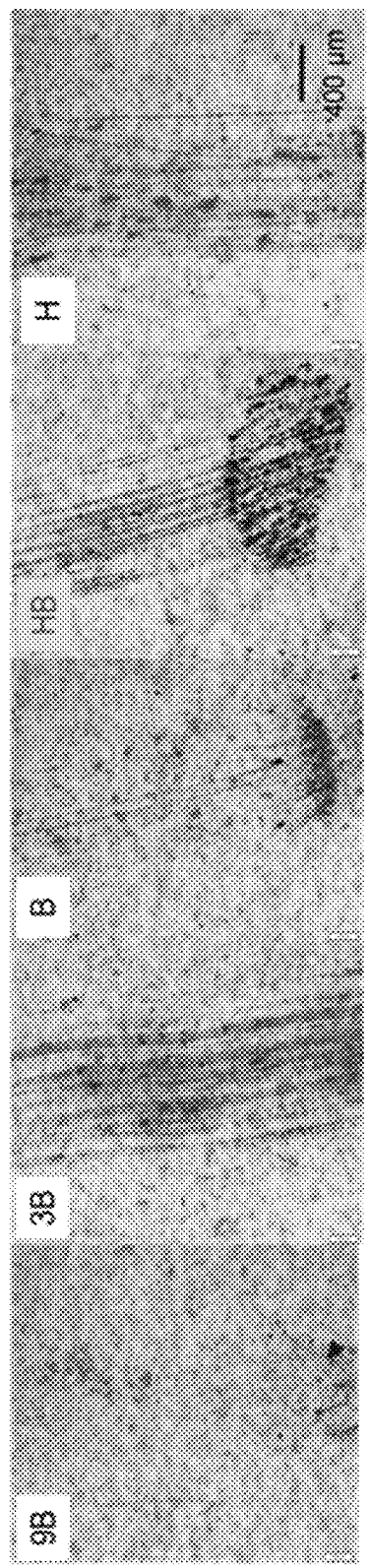
FIG. 22B are optical micrographs of the surface of a polyurethane film coated with Example E formulation after scratching with different pencils (TOISON D'OR 1900 pencils with hardness of 9B, 3B, B, HB, and H).

FIG. 22A presents optical images of virgin PU after scratching with different pencils and FIG. 22B shows optical images of PU coated with Example E after scratching with different pencils. The results suggest that PU has the hardness of 7B pencil, implying that it is soft and easily scratchable. In contrast, the PU coated with Example E film coating shows HB pencil hardness illustrating that the mechanical strength of the PU has improved dramatically (cf. FIG. 22B). The results are similar to measurements on a silicon substrate discussed above, where the coatings displayed HB pencil hardness as well.

Next, a bending test was performed on PU deposited with the Example E coatings, where the sample was bent (⅛") at least ten times and measured the water contact angle and sliding angles of the film. The results indicate that both wettability (=106±3.5°) and sliding angles (=9±1°) remain the same, confirming that bending did not alter the macroscopic properties of the films. In summary, we conclude that the mechanical strength of PU has been improved by depositing the Example E LbL coatings.

The foregoing detailed description and accompanying examples are merely illustrative and are not to be taken as limitations upon the scope of the disclosure. Various changes and modifications to the disclosed embodiments will be apparent to those skilled in the art. Such changes and modifications, including without limitation those relating to the chemical structures, substituents, derivatives, intermediates, syntheses, compositions, formulations, or methods of use, may be made without departing from the spirit and scope of the disclosure.

What is claimed is:

1. A method for generating a coating on a substrate, the method comprising:
   depositing first aqueous solution onto the substrate, thereby forming a first layer,
      wherein the first aqueous solution includes branched polyethyleneimine (PEI) and hydroxy-terminated poly(dimethylsiloxane) (PDMS-OH);
   rinsing the first layer before depositing a second aqueous solution;
   depositing the second aqueous solution onto the first layer, thereby forming a second layer,
      wherein the second aqueous solution includes silicate and PDMS-OH; and
   rinsing the second layer after depositing the second aqueous solution.

2. The method according to claim 1,
   wherein depositing the first aqueous solution includes spray coating the first aqueous solution onto the substrate and
   wherein depositing the second aqueous solution includes spray coating the second aqueous solution onto the first layer.

3. The method according to claim 1, wherein the first aqueous solution further comprises methyl-terminated PDMS (PDMS-$CH_3$); and
   wherein the second aqueous solution further comprises PDMS-$CH_3$.

4. The method according to claim 3, wherein the first aqueous solution includes no less than 0.005 wt % PDMS-OH and no more than 0.025 wt % PDMS-OH;
wherein the first aqueous solution includes a 1:1 ratio of PD MS-OH to PDMS-CH$_3$;
wherein the second aqueous solution includes no less than 0.05 wt % and no more than 0.15 wt % PDMS-OH; and
wherein the second aqueous solution includes a 1:1 ratio of PDMS-OH to PDMS-CH$_3$.

5. The method according to claim 1, wherein the first aqueous solution includes 0.1 wt % to 0.2 wt % PEI.

6. The method according to claim 1, wherein the silicate is sodium silicate; and
wherein the second aqueous solution includes 0.15 wt % to 0.37 wt % sodium silicate.

7. The method according to claim 1, further comprising depositing, successively, the first aqueous solution and the second aqueous solution until the coating includes at least 15 bilayers.

8. The method according to claim 7, further comprising depositing, successively, the first aqueous solution and the second aqueous solution until the coating includes at least 25 bilayers.

9. The method according to claim 8, wherein a last deposited layer of the coating is the deposition of the second aqueous solution.

10. The method according to claim 1, further comprising depositing, successively, the first aqueous solution and the second aqueous solution until a coating thickness is at least 0.1 μm and no greater than 0.2 μm.

11. The method according to claim 10, wherein the substrate is silica, polyurethane (PU), or polyethylene terephthalate.

12. The method according to claim 1, wherein the coating has a transmittance value of at least 94%; and
wherein the coating has a haziness value of no more than 1.0%.

13. The method according to claim 1, wherein the coating has a sliding angle of between 6° and 18° for a test using 25 μL of water.

14. The method according to claim 1,
wherein the first aqueous solution includes:
0.1 wt % to 0.2 wt % polyethyleneimine (PEI); and
0.005-0.025 wt % hydroxy-terminated poly(dimethylsiloxane) (PDMSOH); and
wherein the second aqueous solution includes:
0.15-0.37 wt % sodium silicate;
0.05-0.15 wt % PDMS-OH; and
0.05-0.15 wt % PDMS-CH$_3$.

* * * * *